United States Patent Office 2,754,022
Patented July 10, 1956

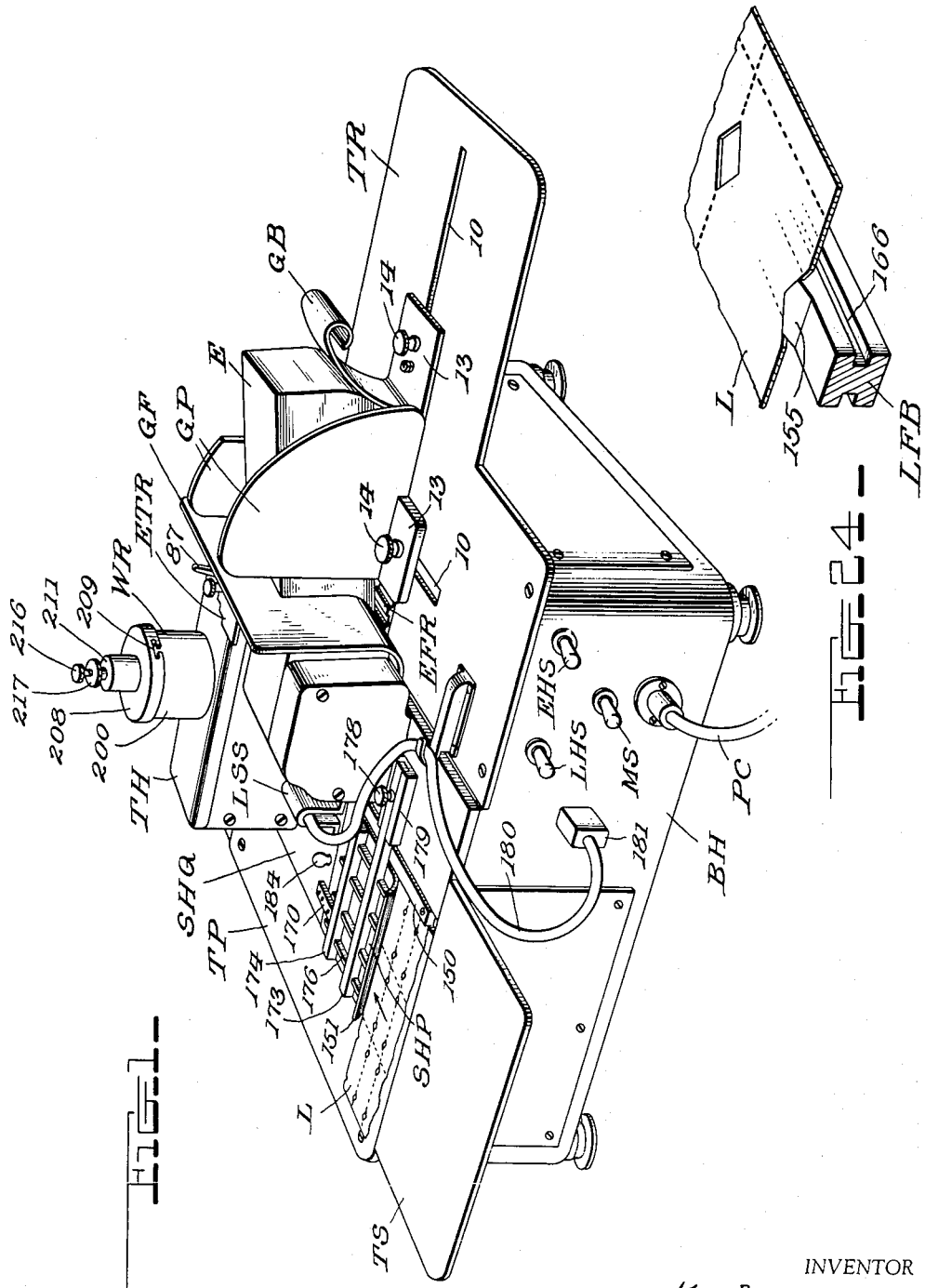

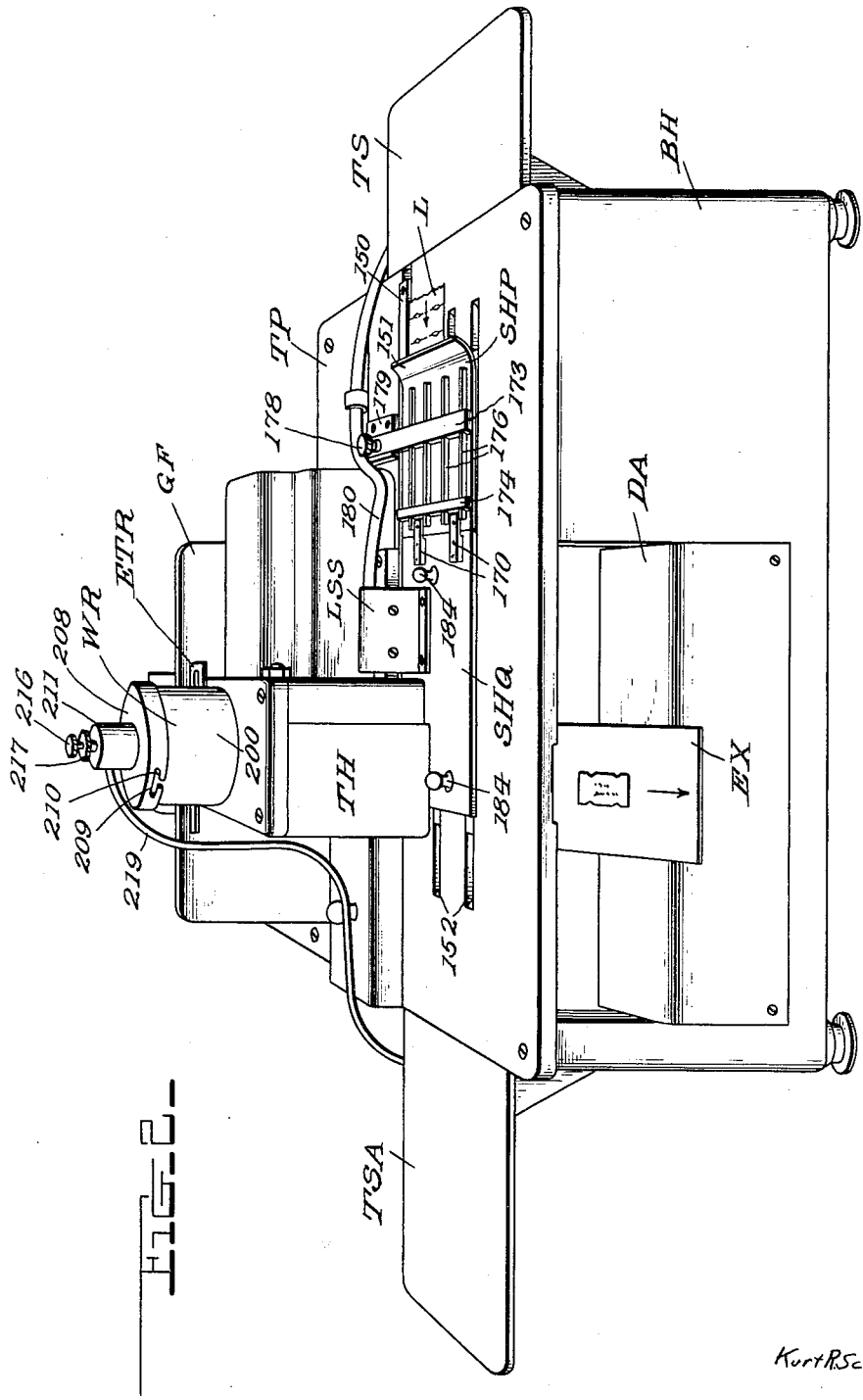

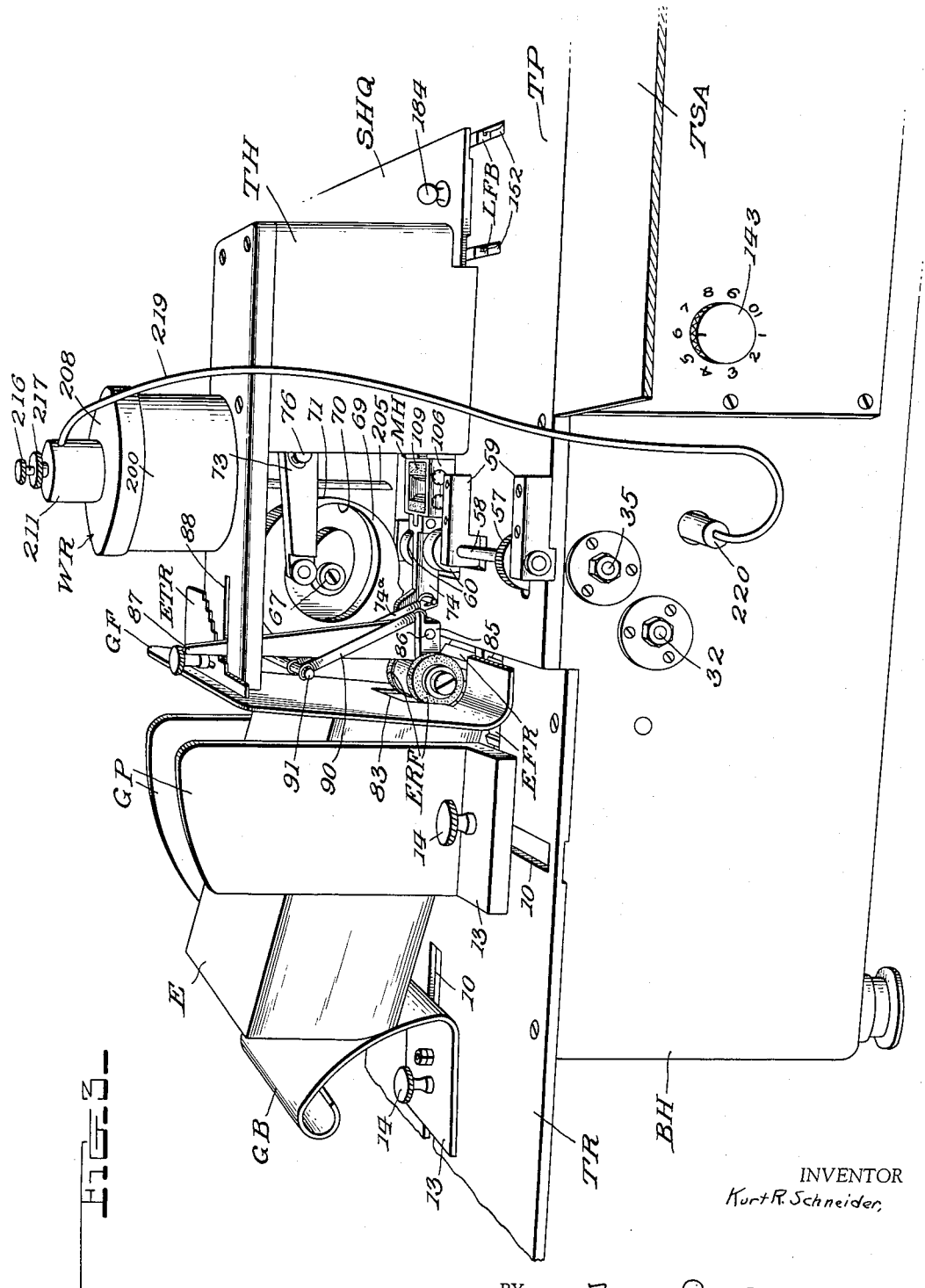

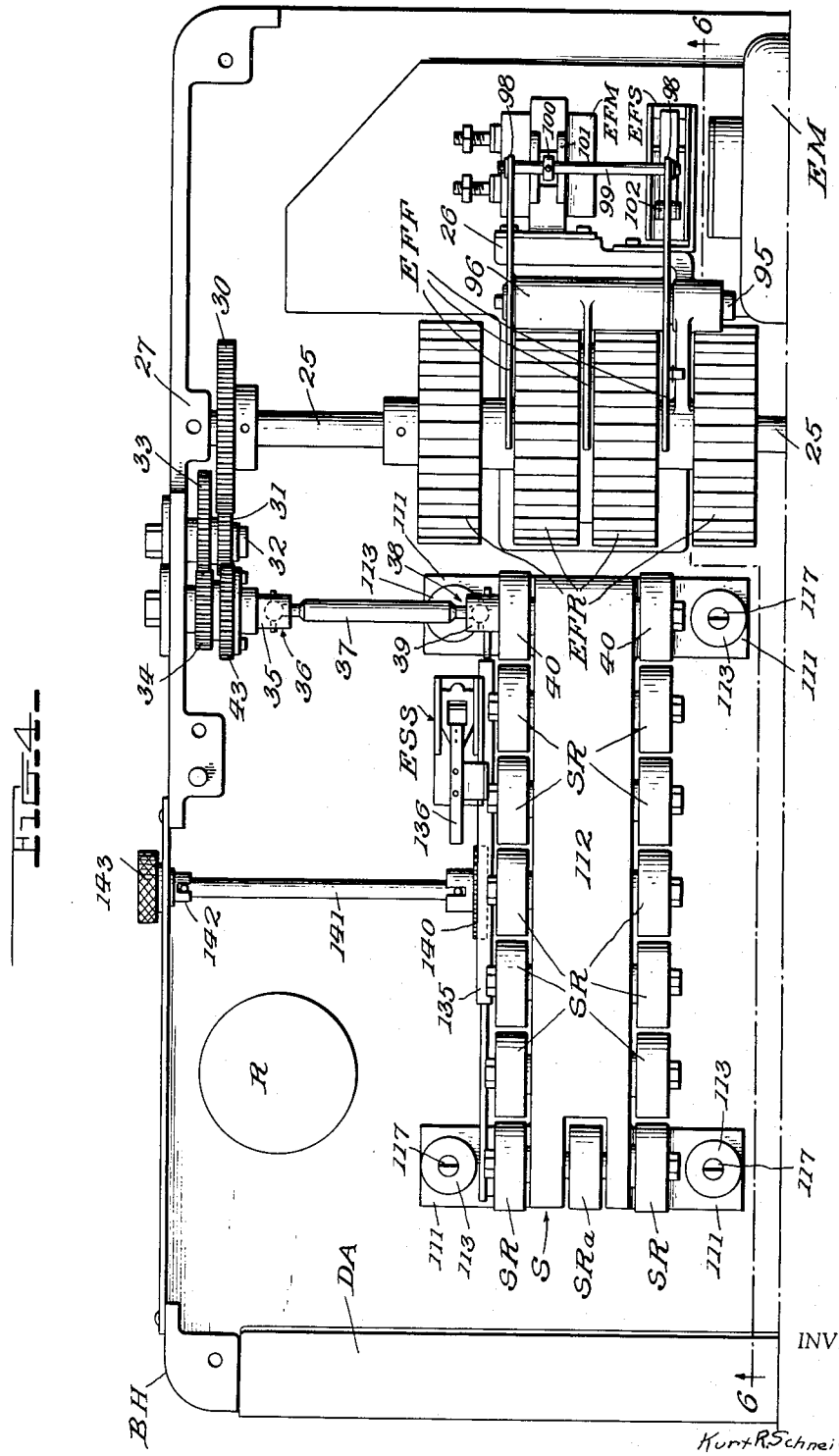

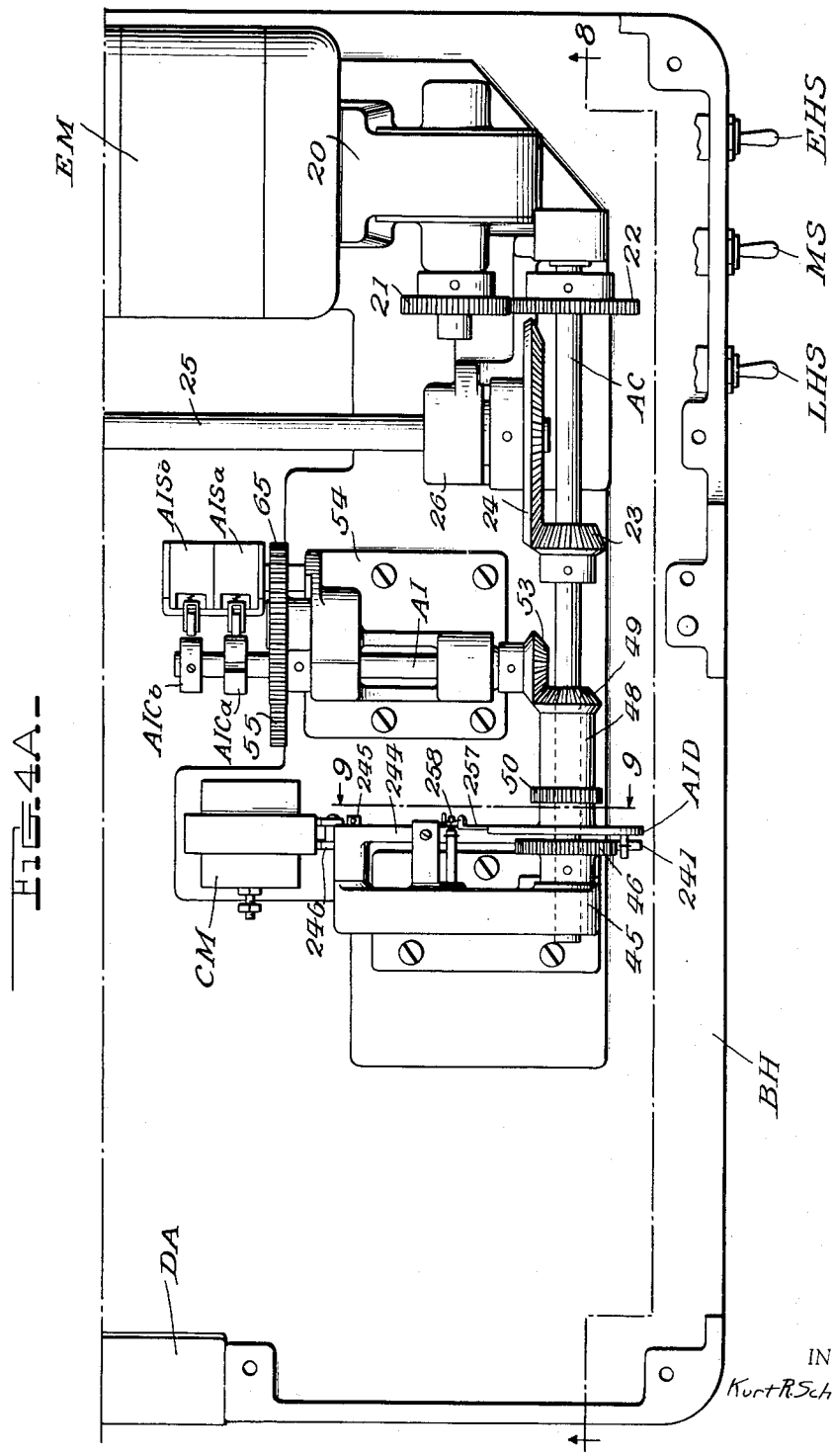

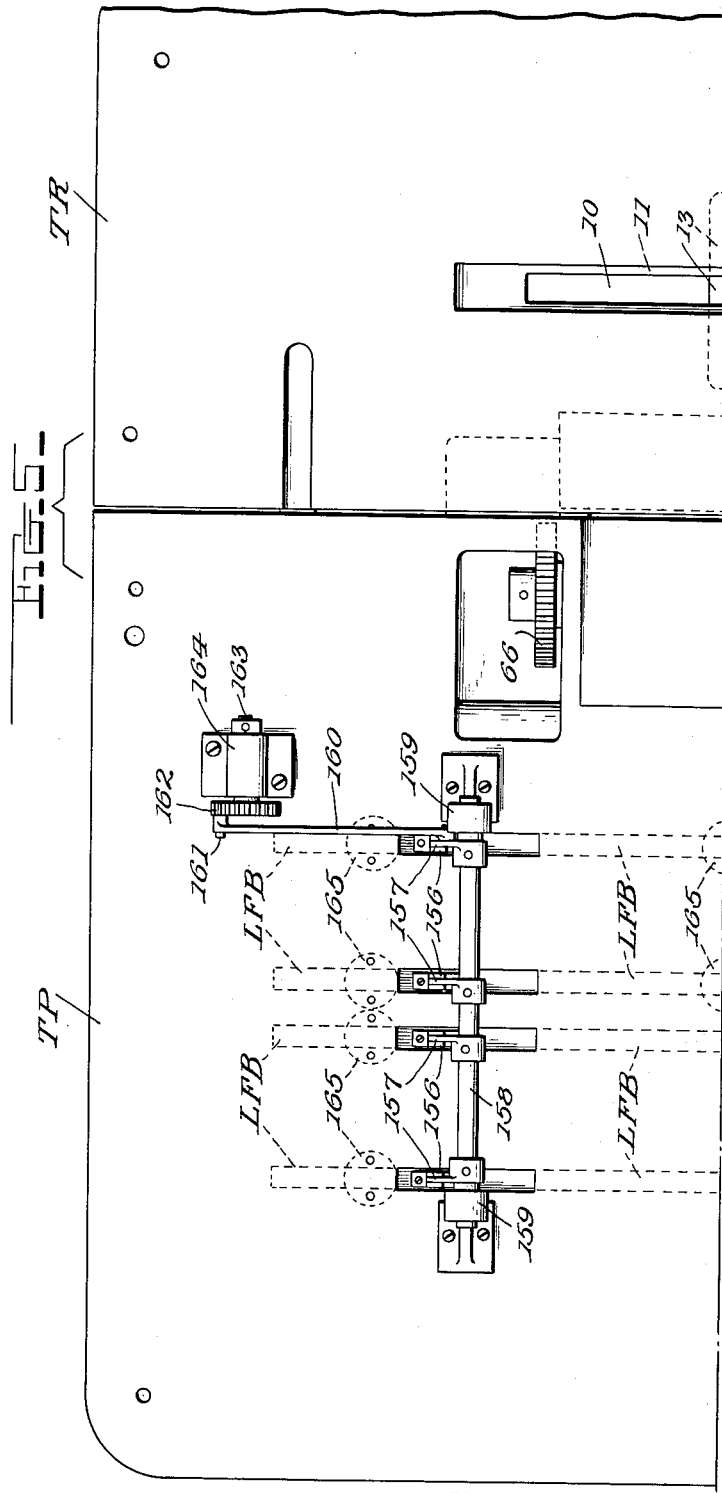

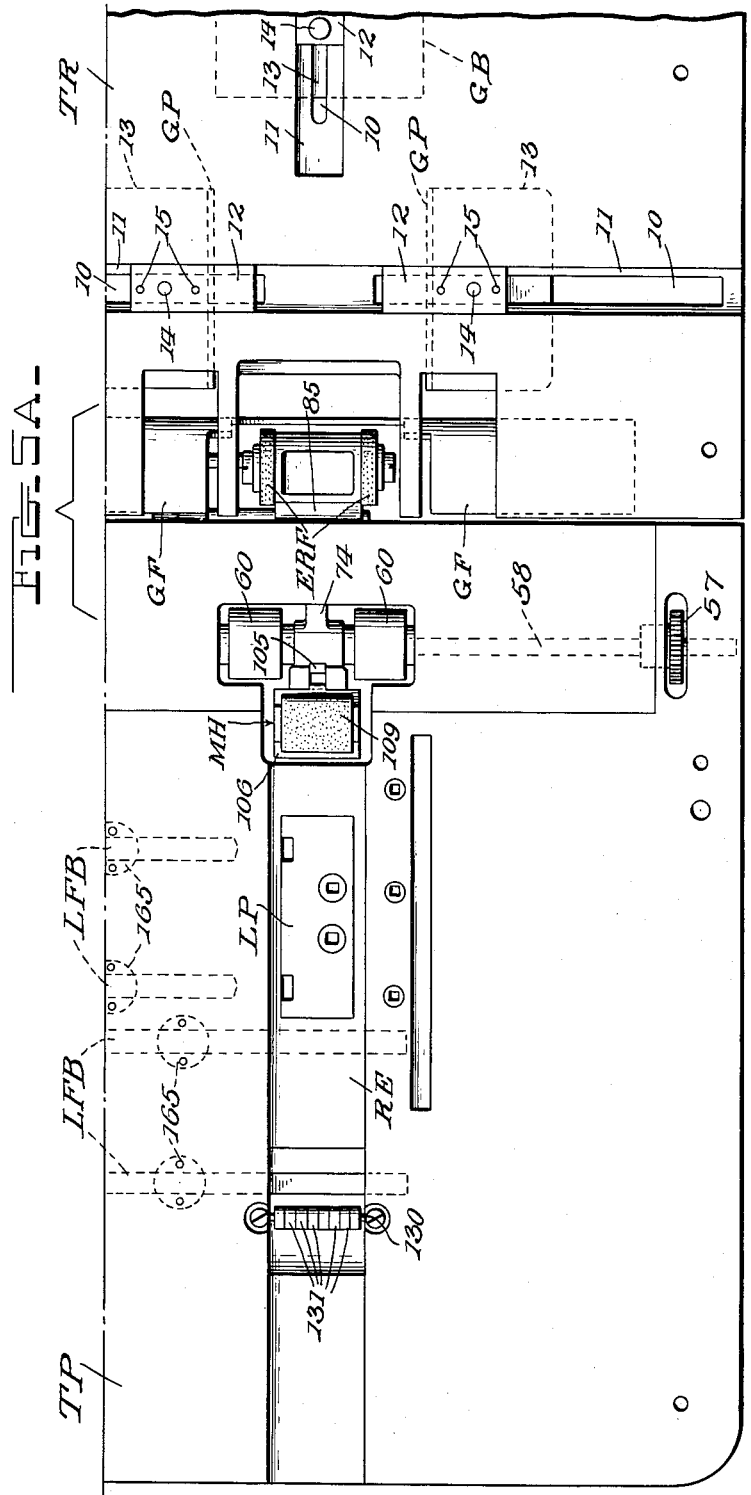

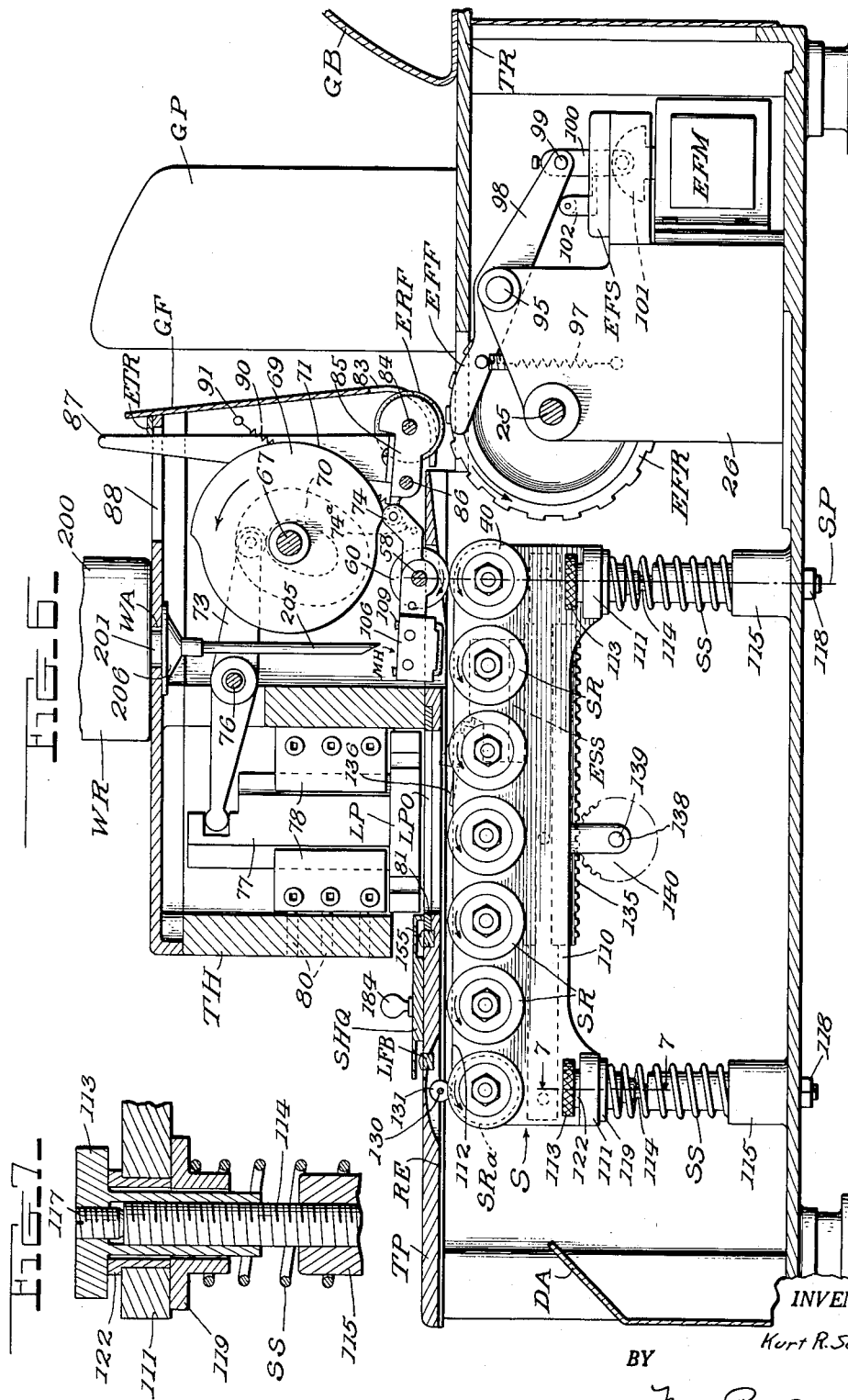

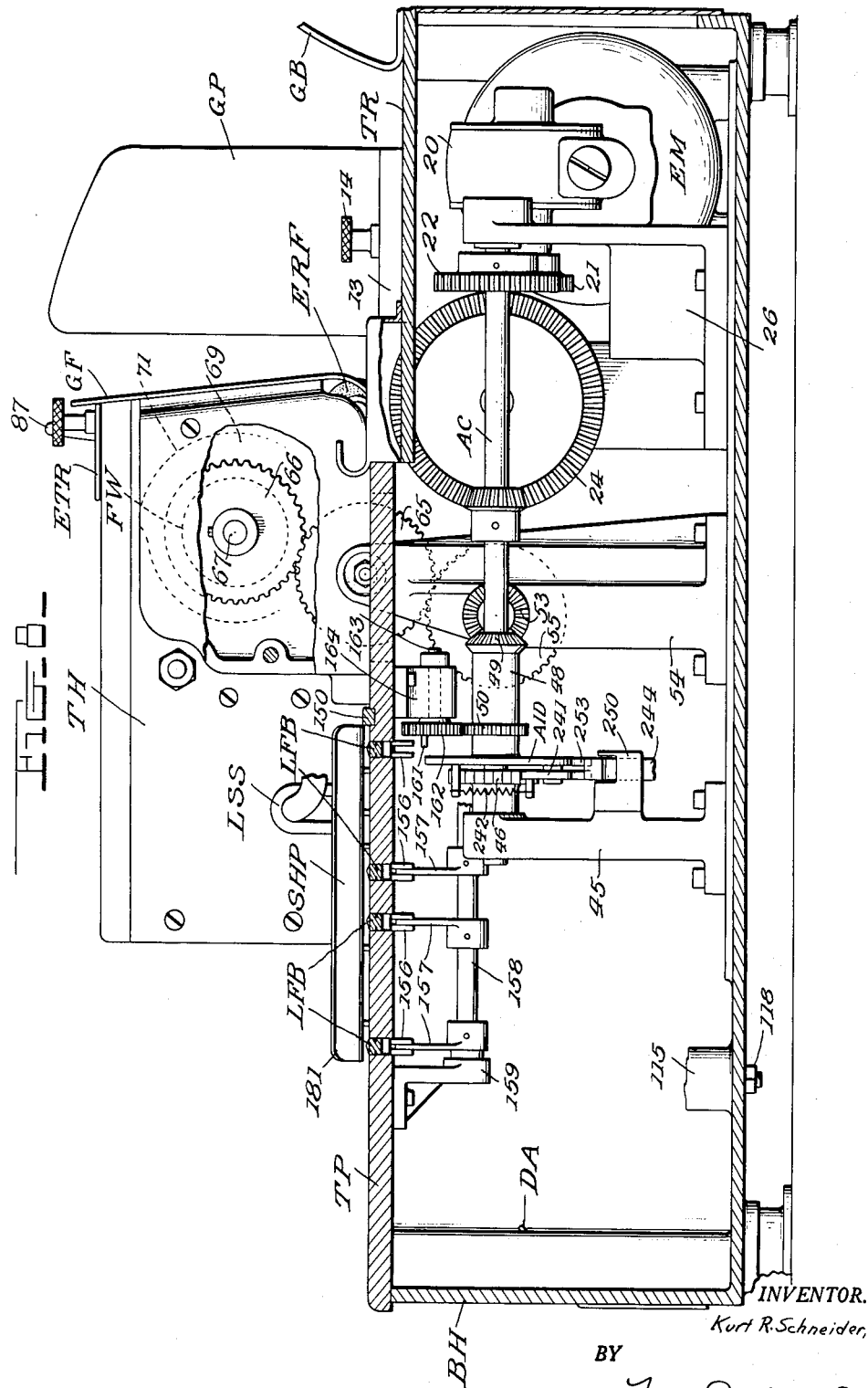

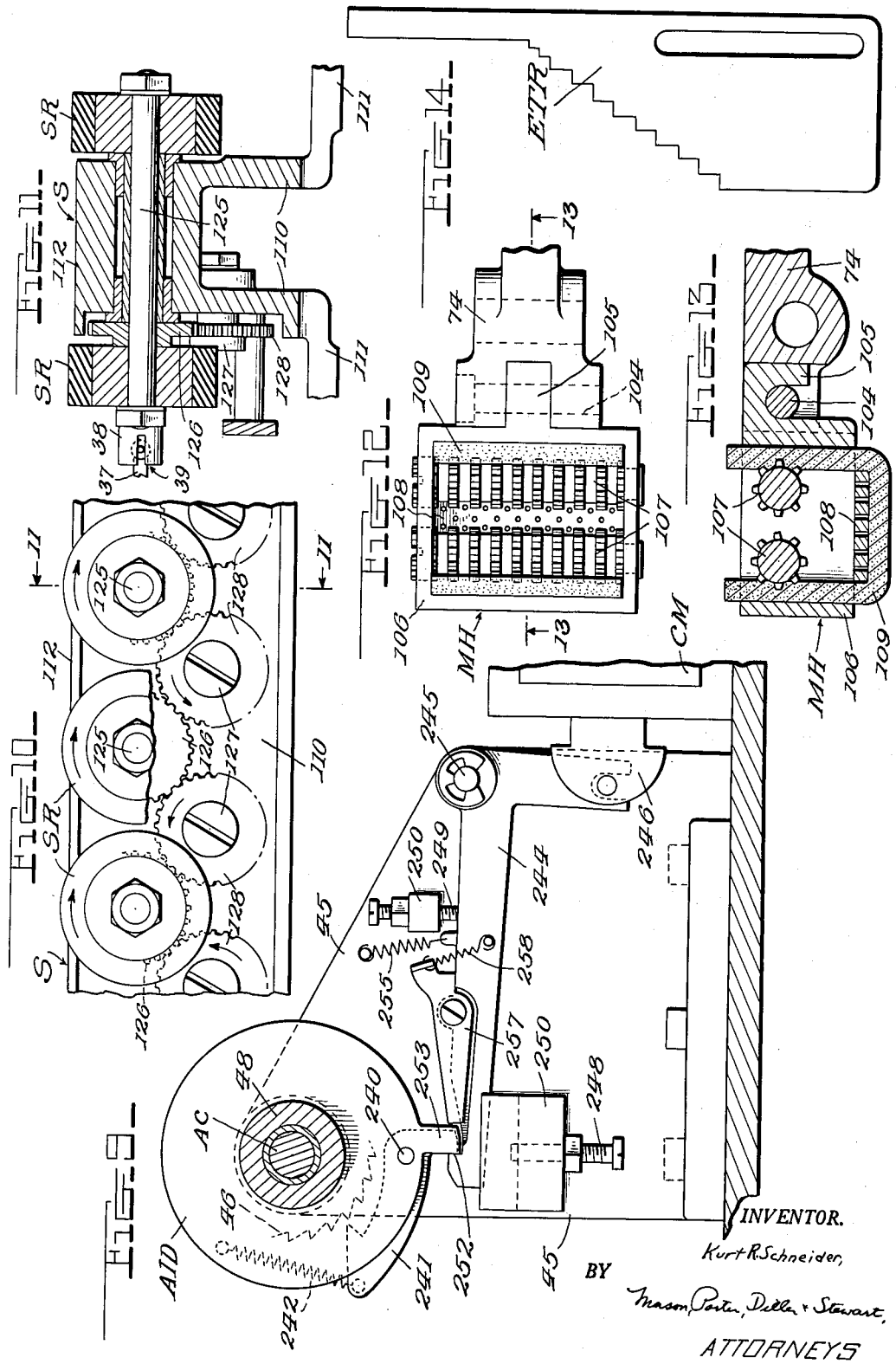

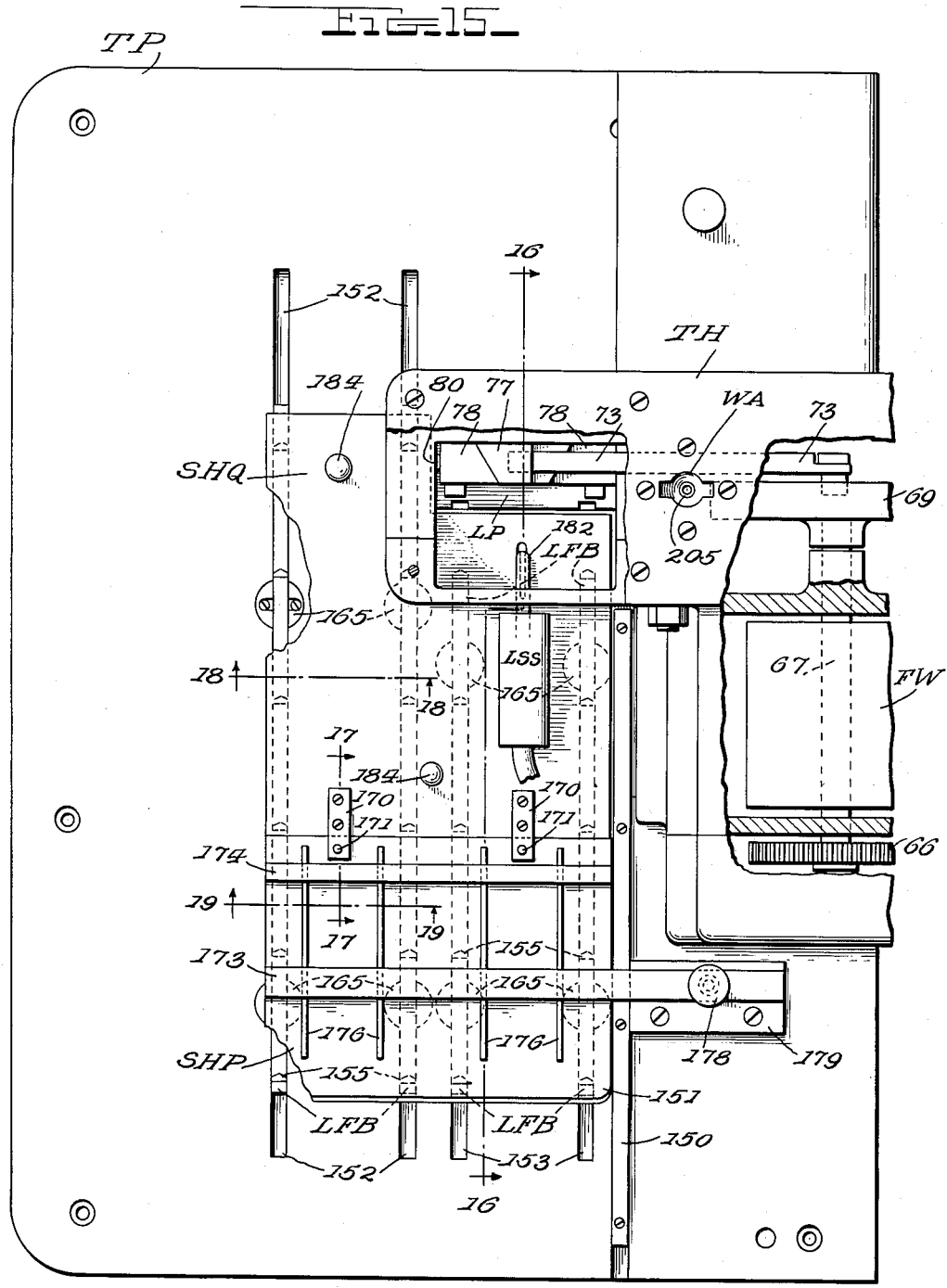

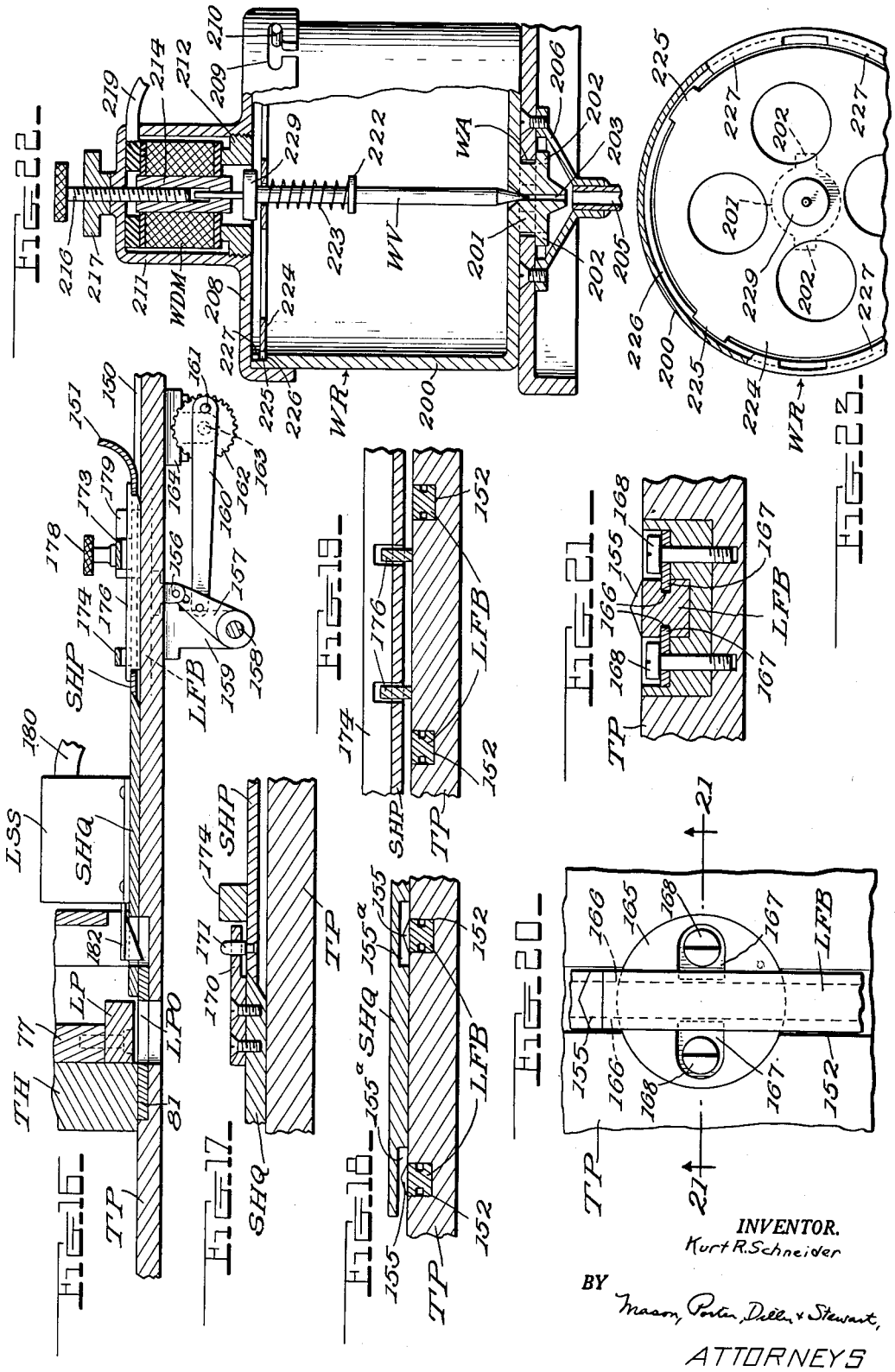

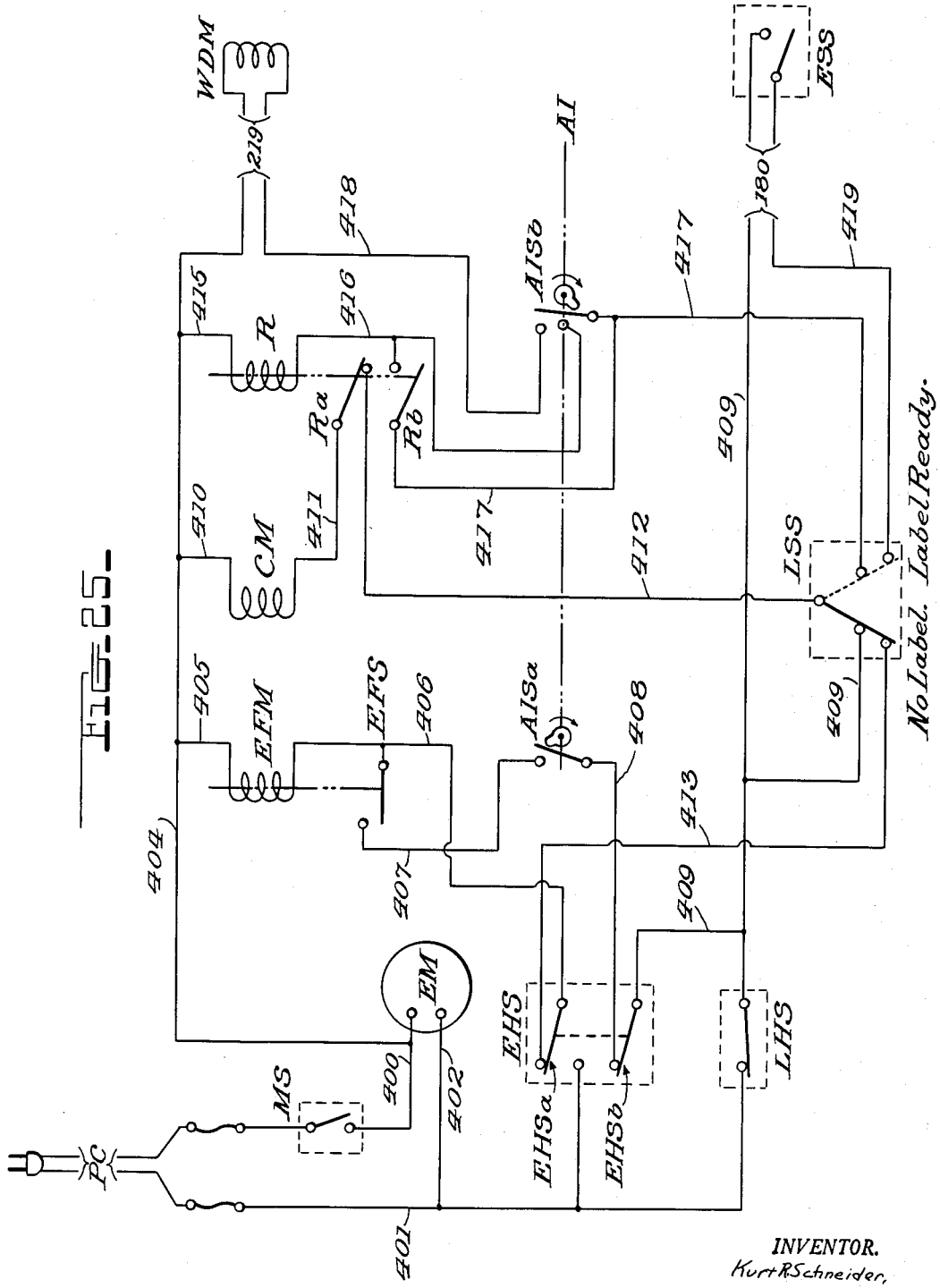

2,754,022

LABELING MACHINE

Kurt Rudolf Schneider, Bainbridge, N. Y., assignor to Eureka Specialty Printing Company, a corporation of Pennsylvania Application May 1, 1952, Serial No. 285,386

30 Claims. (Cl. 216—28)

This invention relates to apparatus for applying labels to successive articles, and is more particularly concerned with mechanisms for labeling envelopes by which the operation is automatic when initiated but is terminated upon failure of article or label supplies.

A feature of the invention is the provision of a structure having means for feeding articles and labels, together with supervisory devices for preventing such feeding if either articles or labels are exhausted.

Another feature is the provision of a structure having means for feeding articles, such as envelopes, of various sizes, together with devices for controlling the place at which a label is fed and applied thereto, and means for preventing such feeding if either articles or labels are exhausted.

A further feature is the provision of a structure having means for feeding articles and labels, together with a driving system for successively advancing the articles to a label-receiving position, and an intermittently operating means for feeding labels under control of a member responsive to the presence of an article approaching the label-receiving position.

Another feature is the provision of a structure having means for feeding envelopes and labels, together with means for preparing the envelope for label adhesion, and supervisory devices for preventing label feeding and envelope preparing operations when no envelope is present for preparation and label reception.

Still another feature is the provision of a structure having means for feeding envelopes, together with a driving system for advancing the envelopes past a label-receiving position, an intermittent drive for feeding labels under control of the position and presence of an advancing envelope, whereby no label delivery occurs if no envelope is advancing, and a label-sensing member for preventing the feeding of an envelope if no label is present for delivery.

With these and other features as objects in view, as will appear in the following specification and claims, an illustrative embodiment is shown, for the application of labels to envelopes, in the accompanying drawings, in which:

Fig. 1 is a perspective view of the machine, seen from an envelope feeding end corner.

Fig. 2 is a perspective view, seen from the delivery end.

Fig. 3 is a perspective view on a larger scale and with parts broken away or removed, seen from the open side of the cam housing, being the opposite side from that in Fig. 1.

Figs. 4 and 4A together constitute a plan view, on a larger scale, with the top plate and upper structures removed.

Figs. 5 and 5A together constitute a bottom view, on the scale of Figs. 4 and 4A, of the top plate.

Fig. 6 is an upright sectional view, substantially on line 6—6 of Fig. 4; and showing both upper and lower structures.

Fig. 7 is an enlarged detail section of a stage support, substantially on line 7—7 of Fig. 6.

Fig. 8 is an upright sectional view, substantially on line 8—8 of Fig. 4A; and showing both upper and lower structures.

Fig. 9 is an upright sectional view, substantially on line 9—9 of Fig. 4A, on an enlarged scale.

Fig. 10 is a fragmentary side view showing a drive for parts of the stage.

Fig. 11 is an upright cross-section substantially on line 11—11 of Fig. 10.

Fig. 12 is a top plan of the moistening head.

Fig. 13 is an upright cross-section substantially on line 13—13 of Fig. 12.

Fig. 14 is a detail view, in plan, of the feed adjustment rack.

Fig. 15 is a top plan view of label feeding elements.

Fig. 16 is an upright section along line 16—16 of Fig. 15.

Fig. 17 is an upright section along line 17—17 of Fig. 15.

Fig. 18 is an upright section along line 18—18 of Fig. 15.

Fig. 19 is an upright section along line 19—19 of Fig. 15.

Fig. 20 is a top plan view, on an enlarged scale, of a shuttle-bar guide.

Fig. 21 is an upright section along line 21—21 of Fig. 20.

Fig. 22 is a diametrical upright section through the water font.

Fig. 23 is a top plan view of the water reservoir, with the cover removed.

Fig. 24 is a perspective view of a feed finger, in its cooperation with a label strip.

Fig. 25 is a circuit diagram.

The machine is illustrated in a form particularly adapted for mailing purposes, in which it applies pre-addressed labels to individual items of mailing matter such as postcards, empty or stuffed envelopes, and other shipments which are to be sent to selected groups of addressees. Post and postal cards, tags, label sheets, empty envelopes, filled envelopes, flexible wrapped matter, and other articles may have labels attached thereto; and such come under the generic word "envelope" in the following.

As shown in Figs. 1 to 3, the illustrative machine has a base housing BH containing power and driving parts and some other control structures and including a floor on which are standards to aid in supporting parts. A top plate TP and a top housing TH are mounted on the base housing, and on the top housing TH is mounted a reservoir WR for moistening liquid. A stack E of envelopes is supported by guide members GP, GB, GF, and these are individually delivered from the bottom of the stack and through the mechanism, wherewith a selected part of the face area of each is moistened and then a label is applied thereto, and finally the envelope with the label secured thereon is delivered from the machine, as shown by the article EX in Fig. 2, over a delivery apron DA. The labels are provided in pre-addressed sheets L, which are placed on the top plate TP and are fed by the machine beneath the label top plates SHP, SHQ, into position so that labels are presented beneath the top housing TH and are delivered individually and in succession upon the envelopes at the pre-selected areas thereof, as these envelopes are fed through the machine.

As shown in Figs. 1, 3, 5 and 5A, slots 10 are provided in the rear table extension TR, which are wider at the bottom surface (Fig. 5A) to provide shoulders 11 against which are fitted the clamping plates 12 opposite the top pads 13 of the guides GP, GB for the envelope stack E, the parts being clamped by the screws 14 in a desired relative position of adjustment and with employments of dowels 15 to maintain proper alignment. By loosening the screws 14 of the side plates GP, these may be individually slid toward or from one another, to provide proper spacing for the envelope stack E, and to position the envelopes so that the desired portion of the face of each envelope will move forward through the machine in a proper relationship to the label-delivering devices: the screws are then tightened again to hold the side plates GP in such positions. Similarly, loosening the screw 14 of the back guide member GP permits moving this forwardly and rearwardly relative to the front plate GF, so that the stack of envelopes E will present the lower individuals in the desired combed and inclined position for accurate delivery to the envelope feeding system: that is, the curved forward surface of the guide member GB is positioned so that its lower edge is at a lesser distance from the nip of the envelope feeding rollers than the length of the envelopes, and the proper feeding of the envelopes is facilitated by the straightening of the envelope when it is engaged by the feeding rollers, wherewith its rearward end drops away from the stack to assist in the stripping of the lowermost envelope from the envelope next above.

POWER DRIVE

Within the base housing BH and beneath the top plate TP is arranged an electric motor EM as shown in Figs. 4 and 4A, which operates through a drive contained within the drive housing 20 to rotate a gear 21 and therewith a gear 22 located on the constant drive shaft AC. A bevel gear 23 on shaft AC is in mesh with a bevel gear 24 fixed on the feed shaft 25 which supports the lower envelope feeding rollers EFR, of which four are provided in the illustration. The shaft 25 is supported by a pedestal or standard 26 and by a bearing portion 27 of one side member of the base housing BH. A large gear 30 fixed on shaft 25 drives a gear 31 mounted on a stud 32 of the base housing BH and connected to a larger gear 33. Gear 33 is in mesh with a smaller gear 34 fixed on a shaft 35 rotatably carried in the base housing BH and having at its inner end a universal joint 36 by which it drives the shaft 37 which is connected by a second universal joint 38 to the shaft 39 in the stage assembly S, whereby the rollers 40 on the stage are being constantly driven at a peripheral speed greater than the peripheral speed of the envelope feed rollers EFR.

The gear 31 is in mesh with a larger gear 43 carried by a sleeve on the stud 35.

The constantly driven shaft AC is carried by bearings on standards 26 and 45 mounted in the base housing BH, and has fixedly connected thereto a ratchet 46, Figs. 4A, 8 and 9. A sleeve 48 is mounted on the shaft AC for rotation relative thereto and has a bevel gear 49, a small spur gear 50, and a rotating clutch plate AID. The bevel gear 49 is in mesh with the bevel gear 53 on the intermittently driven shaft AI carried by bearings on the support member 54 mounted in the base housing BH. The shaft AI has fixed thereon a gear 55, and the two shaft cams AICa and AICb for actuating the corresponding switches AISa, AISb.

The gear 43 is in mesh with a gear 57 (Fig. 3) mounted on a shaft 58 carried by bearing blocks 59 on top of the top plate TP and supporting the top stage feed rolls 60 (Figs. 3 and 6) which engage the upper surface of the envelope as it moves over the first rolls 40 of the stage, the shaft 58 also providing support for a moistener structure as will be described hereinafter.

The gear 55 on the intermittently driven shaft AI (Figs. 4A and 8) is in mesh with an idler gear 65 carried by bearings of the pedestal standard 54, and this idler in turn is in mesh with the gear 66 fixed on the cam nest shaft 67 journalled in the top housing TH. A cam piece 69 fixed on the shaft 67 (Fig. 3) has a cam groove 70 in one face thereof, and its peripheral edge 71 is formed as a second cam. The cam groove 70 engages a roller (Fig. 3) on the punch lever 73; while the edge cam 71 (Fig. 6) engages a roller on the rock arm 74 which is mounted on the shaft 58 and carries a moistening head MH. A flywheel FW is secured to the shaft 67 (Fig. 15) to steady the motion during punching.

The rock lever 73 of the punch (Fig. 6) is carried by a frame pivot 76 and engages in the punch stem 77 which has a head formed as a label punch LP. The stem 77 is guided in the top housing TH by a gib-way with side plates 78, so that wear therein may be compensated by the usual shims (not shown), and by the gib screws 80 in the usual fashion. The punch cooperates with the die plate 81 having an opening LPO.

DRIVING CLUTCH

The constantly actuated driving shaft AC is coupled intermittently for actuating the intermittent shaft AI through an electrically controlled clutch in the illustrated form: each initiated movement produces a cycle of operation by a single revolution of the shaft AI.

The clutch plate AID (Figs. 4A, 8 and 9) on the sleeve 48 carries a pivot 240 for the traveling pawl 241 having a spring 242 which urges the pawl into engagement with the ratchet 46 secured to the constantly driven shaft AC. A clutch lever 244 is mounted on a pivot 245 carried by the standard 45 and having a lower arm connected to the core 246 of the clutch solenoid CM so that energization of this solenoid causes a counterclockwise movement of the clutch lever 244, in Fig. 9. The end positions and extent of motion of the clutch lever are controlled by adjusting screws 248, 249 carried by blocks 250 on the standard 45. The outer end of lever 244 (Fig. 9) has a shoulder 252 which is held in the path of movement of the peripheral extension 253 of the clutch plate AID when the lever 244 is in its upper position as shown in Fig. 9, and thus serves to stop the motion of the clutch plate AID at a predetermined point in the revolution thereof. This shoulder 252 also engages the outwardly turned end of the pawl 241 shortly before the projection 253 encounters it, and thereby serves to rock the pawl 241 and disconnect it from the ratchet 46 and thereby interrupt the flow of energy to the intermittent shaft. The spring 255 pulls the lever 244 toward an upper position when the solenoid CM is de-energized. A latching piece 257 is pivoted on the lever 244 and is moved by spring 258 so that it will yield when encountered by the projection 253, but will immediately return behind this projection and thus prevent any rebounding of the clutch plate AID, with consequent possible error as to the beginning of the cycle of movement.

ENVELOPE FEEDING AND MOISTENING

The stack E of envelopes is placed between the side guide plates GP which are adjusted closely to conform to the width of the stack, and they rest against the front guide plate GP which has a curved lower edge (Figs. 3 and 6) beneath which the envelopes are to be fed one by one, and which terminates below the lower surface of the top plate TP to guide the envelopes therebeneath. The guide back plate GP is adjusted so that the stack rests in an inclined and combed position, so that gravity and the pressure of the overlying envelopes assist in the feeding. The rear extension TR (Figs. 3 and 6) of the top plate has its upper surface below the level of the top of the envelope feeding rollers EFR. A pair of non-rotating friction rollers ERF are mounted in a notch 83 of the front guide plate GF and project therethrough so that they engage with the lower envelopes of the stack E. These rollers ERF are supported by a shaft 84 carried on the arm 85 pivotally mounted by the pin 86 on the top housing. An adjustment arm 87 is fixed to the arm 85 and extends through a slot 88 in the top of the top housing TH and can rest against a step of the envelope thickness adjustment rack ETR (Figs. 1, 3 and 6). A coil spring 90 having its upper end engaged around the pin 91 in the top housing has its lower end connected to the arm 85, and thus exerts a constant effort for rocking the assembly so that the friction rollers ERF are moved downwardly by an amount determined by the presence of an envelope beneath them, or by the engagement of the arm 87 with the adjustment rack ETR.

A pivot 95 on the support block 26 carries a sleeve 96 upon which are provided three envelope feed fingers EFF (Figs. 4 and 6), each being located in a gap between two adjacent envelope feed rollers EFR. A spring 97 exerts force upon these feed fingers, tending to move them counterclockwise in Fig. 6. Arms 98 connected to the sleeve 96 support a pivot 99 which carries a link 100 connected to the core 101 of the envelope feed solenoid EFM. An envelope feed switch EFS is mounted on a bracket of the standard 26 and has a control member 102 by which the switch is actuated as the arms 98 are raised and lowered.

The moistening head structure MH is shown in Figs. 3, 5A and 6, and the specific form is illustrated in detail in Figs. 12 and 13.

The rocker arm 74 is bifurcated and has a transverse pin 104 extending between the tines for receiving the hook 105 of a rectangular body 106 having two openings in each end wall thereof for receiving the adjusting and clamp members 107 which are rotatable therein. A preferred manner of making these members is to cut them from pinion stock of the type employed for making pinions in odometers, by turning grooves in the peripheries thereof down to the bottoms of the tooth gaps, and cutting saw kerfs at the ends, whereby the members may be rotated.

A perforated plate 108 is provided at the bottom of the frame 106. An absorbent and liquid-transmitting wick member 109 of fabric is placed in this structure, for example by introducing its ends relatively from the bottom (Fig. 13) and rotating the clamping members 107 to draw the two legs of the wick upwardly; the bottom plate 108 is inserted, and then the members 107 are further rotated until the wick is tightly drawn into position.

The central opening of the frame 106 is located (Fig. 6) beneath the end of the drop tube 205. A spring 74a is connected to the rocker arm 74 and to the pin 91 to rock the arm and lower the moistening head MH toward and into contact with the envelope, i. e. to its envelope-moistening position, when the arm is permitted so to rock by the action of the cam edge 71.

THE STAGE ASSEMBLY

The stage assembly S (Figs. 4, 6, 10 and 11) comprises a frame structure having the side plates 110 with laterally projecting foot pieces 111 near their bottoms, and a smooth top portion 112. The feet 111 (Figs. 4, 6 and 7) are apertured, and each includes a resiliently supporting and motion limiting structure comprising a knurled head 113, with a depending stem which is internally threaded to receive the threaded rod 114 secured in a respective boss 115 on the floor of the base housing BH. A set screw 117 controls the maximum downward movement of the head 113. The rod 114 is held against movement by the lock nut 118. A flanged spring head piece 119 bears against the foot 111 and receives the upward thrust of the coil spring SS, this spring being at its lower end engaged against a shoulder (Fig. 6) of the boss 115 so that the reaction of the spring is transferred to the base housing. These units are provided at the four corners of the stage, and it will be noted that the vertical axis plane SP (Fig. 6) through the two supporting structures nearest the envelope feed rollers EFR also includes the axis of the end pair 40 of the stage rolls SR, so that a downward force exerted upon the rollers 40 at this end of the stage is accompanied by a vertically downward movement of this end of the stage as a whole against the pair of stage springs SS: and likewise, as the envelope progresses along the stage S, the stage is depressed by an amount determined by the thickness of the envelope and its contents, against the action of the springs SS which act individually. The feet 111 receive the guide sleeves 122 which surround the stems of the adjustable heads 113: so that downward movement of one or more feet 111 results in the movement of the corresponding sleeve 122 and a spring head piece 119 along this stem, with a compression spring SS. The parts 119, 122 are fitted with a tolerance which permits minor longitudinal and lateral rocking motions of the stage to conform to the passing envelope.

The stage rolls SR project above the central flat top portion 112 of the stage body and are fixed on throughshafts 125 (Fig. 11) which turn in bearings in the stage assembly. Each shaft has a gear 126 secured thereto. Studs 127 are mounted on the stage S and support individual idlers 128 which are located between and interconnect each two adjacent gears 126. Thus, the rotation of the first pair of rollers 40 is accompanied by a similar positive rotation of the other rollers SR, in the same direction, as indicated by the arrows in Fig. 10.

At the delivery end of the stage, the top portion 112 is notched (Fig. 4) to receive a central roller SR$a$, of a somewhat smaller size than the other rollers SR. The top plate TP, Figs. 5A and 6, has a bottom groove RE, about 1/32 inch deep to allow transit of the envelope without contact of the wetted label area thereof with the top plate, and also is hollowed out and supports a shaft 130 having thereon a number of independent pressure rolls 131, their periphery slightly protruding below the plane of top plate TP, for engaging the upper surface of the passing envelope, and forcing the same downward against the underlying central stage roller SR$a$, depressing this part of the envelope below the parts thereof which are supported by the side rollers SR due to difference of the size of the rollers SR and SR$a$, to assure the proper pressing of the label upon this envelope as well as breaking the tendency to adhere to top plate TP, which is especially true with lighter material such as cards.

When no envelopes are going through the machine the stage rollers SR do not touch the top plate TP; nor do the stage rollers SR$a$ or 40 run in contact with their respective overlying mates. When idling, a clearance of about 0.005 inch is provided to avoid any drag. In practice, at this spacing, sufficient friction is attained even with post cards and like material having a thickness of only 8 or 10 thousandths inch.

A rack 135 (Fig. 6) is slidably mounted upon one side plate 110 of the stage S and supports an electrical switch ESS which senses or determines the presence of an envelope moving along the stage, by the engagement of the leading edge of such an envelope with the circuit closing finger 136. The stage S has a bearing bracket 138 for the shaft end 139 for supporting a pinion 140 in mesh with the rack 135. The shaft end 139 (Fig. 4) has a universal connection with the shaft piece 141 which at its outer end, adjacent a side wall of the base housing BH, has a universal connection 142 with the externally accessible adjustment knob 143 (Figs. 3 and 4), this knob having an indicator movable opposite a divided scale, so that rotation of the knob 143 to an indicated point on the scale will produce a corresponding calibrated motion of the pinion 140 and therewith of the rack 135, and therewith the envelope sensing switch ESS will be correspondingly positioned so that its finger 136 will be actuated, by an advancing envelope, at a predetermined point of the length of the stage S, and thereby the label will be applied to this envelope at a thus-determined region along the length of such envelope.

LABEL FEEDING, CUTTING AND DELIVERY

As shown in Figs. 1, 2 and 15, above the top plate TP are located two label guide plates SHP, SHQ. A sheet of labels L may be introduced into the machine by laying it flat and face upward on the top plate TP and its extension TS, with one edge loosely guided by the rail 150 mounted on the top plate, and sliding the forward edge of the label sheet L beneath the upwardly curved edge 151 of the label plate SHP.

The grooves 152, 153 in the upper surface of the top plate receive corresponding shuttle bars LFB (Figs. 15–21) having upwardly projecting feeding lugs 155 which engage in apertures in the label sheet L, and move this sheet forwardly.

The shuttle bars LFB have lugs 156 (Figs. 5, 8 and 16) which extend downwardly and engage in the slotted ends of rock levers 157 mounted on the rock shaft 158 carried by brackets 159 on the bottom of the top plate TP. The shaft 158 and arms 157 are rocked back and forth in a label feeding cycle by a link 160 connected to a crank pin 161 on the gear 162 mounted on a small shaft 163 carried by the bracket 164 and engaged (Fig. 8) with the gear 50 (Figs. 4A and 8) on the sleeve 48.

The shuttle bars LFB are preferably guided within their respective grooves 152 by bearing pieces 165 (Figs. 20 and 21) formed of self-lubricated material such as porous metal having a saturation of lubricant. These bearing bodies 165 are located within circular enlargements (Fig. 20) of the grooves 152 in the top plate TP and have diametrical top grooves for closely receiving and guiding the corresponding shuttle bar LFB. The shuttle bars have grooves 166 along their vertical sides for receiving the guide fins 167 located within correspondingly shaped top cavities of the bodies 165. Screws 168 pass through the fins 167, the body 165, and into the top plate TP (Fig. 21) to secure all parts in the desired position, and to permit the free and guided travel of the corresponding shuttle bar LFB.

The label top plate SHQ (Fig. 18) is grooved on its lower side at 155A to receive, and permit free movement of, the feeding fingers 155 on the shuttle bars LFB.

The rearward edge of the label holding plate SHP is beveled and fits closely against a correspondingly beveled forward edge of the plate SHQ (Fig. 17) so that the leading edge of the label sheet L when fed by the fingers 155 on the shuttle bars LFB is free to lift the plate SHQ, and permit the continued forward movement of the label sheet. Fingers 170 are fixed on the top of the top plate SHQ and overlap the plate SHP, having apertures for receiving the locating pins 171 of the plate SHP (Figs. 15 and 17) so that the two plates are held against relative longitudinal and transverse motion, but have a permitted relative vertical motion.

The front feeding plate SHP is slotted, and is transversely stiffened by the bars 173, 174 (Figs. 1, 2, 15, 16, 17 and 19) and receives the weighting bars 176 which are guided by the walls of notches in these bars and have projecting upper ends (Fig. 16) so that they cannot drop through the slots of the plate SHP: they are limited against upward accidental removal by the bars 173, 174. The front lower edges of these bars are beveled (Fig. 16) so that they are raised slightly as the label sheet is forced beneath them. The bar 173 extends beyond the guide rail 150 and has a narrow hand piece 178 by which it may be lifted if so desired, the bar extending into a closely fitting groove of the support member 179 mounted on the top plate TP (Figs. 1, 2 and 15) for fixing the position of the plate SHP and therewith of the plate SHQ, so that it is not carried along during the shuttle or label movements. Preferably this handle 178 has a projecting threaded pin extending beneath the bar 173 and engaged in a threaded aperture of the support 179, and determining the transverse position of the plates SHP, SHQ. Thus, the plates may be removed by simply lifting them successively or together out of the positions shown in Figs. 1 and 2, upon release of the threaded connector.

The plate SHQ supports a label sensing switch LSS which is connected by a cable 180 and separable plug 181. This switch LSS has an actuating finger 182 which projects (Figs. 15 and 16) into position for engagement by a label which is ready to enter beneath the punching station: and this label sensing switch LSS thus is able to control supervisory circuits when a label is ready for employment.

Lifting knobs 184 are provided on the plate SHQ, and the top housing TH (Figs. 3, 6 and 16) has its lower edge spaced from this plate, whereby the plate may be easily lifted and removed from the position shown in the drawings, if so desired.

As shown in Fig. 16, the plate SHQ terminates short of the label punch LP, so that the punch is free to operate upon the column of labels advancing successively to position beneath the punch: the plate SHQ being continued (Fig. 2) in front of the top housing TH, outside of the area through which the punch LP reciprocates.

MOISTENING SYSTEM

The illustrative structure employs labels which are to be attached to the envelope by applying a liquid to a selected area of the envelope face, and then pressing the label thereon. The specific illustration is of the employment of a label sheet having re-moistening gum on the reverse or bottom surface thereof, with employment of water for pre-moistening the envelope before the label is applied thereto.

The delivery of the liquid to a moistening element, and the moving of this element into contact with the envelope, are controlled from the intermittently driven shaft AI, and supervised electrically so that no action occurs if no envelope is moving through the machine.

The reservoir WR is mounted on top of the top housing TH (Figs. 1–3, 6 and 22). It comprises a container 200 having a bottom projection 201 with laterally projecting ears 202, this projection in one position passing into and through an aperture WA of corresponding shape in the top of the housing TP (Fig. 15), so that upon rotation of the container 200 about the vertical axis, the ears 202 are moved to positions beneath the top plate, and prevent direct upward withdrawal of the container. This projection has a channel 203 therethrough, through which the liquid may move into the drop tube 205 (Figs. 6 and 22), the lower end of this tube being beveled to control accurately the droplet which is delivered therefrom into the moistening head MH. The tube 205 is supported by a dished head 206 secured beneath the top wall of the housing TH.

A removable cover 208 for the container 200 has a skirt with its lower edge having notches 209 to engage the pins 210 with a locking connection, to prevent accidental separation of the cover from the container. The cover has an upward extension 211 which receives the electrical coil WDM of the liquid dispenser magnet structure which is secured within the extension by the hollow closing plug 212. The core 214 of the magnet structure has a bore within which may be moved the upper end of a metal valve body WV, this upper end being of magnetizable material so that the valve body is raised each time that the liquid dispensing magnet coil WDM is energized. The core 214 also has a threaded portion for receiving the adjusting screw 216 effective for limiting the distance of upward attracted movement of the liquids valve WV, and having a lock nut 217 for securing the same in adjusted position. The electrical conductors from the coil WDM are illustrated as contained in a cable 219 (Figs. 3 and 22), leading to a separable plug 220, so that the demountable liquid supply structures can be separated from the machine if so desired.

A collar 222 on the valve WV receives the lower end of a spring 223 which reacts at each upper end against a spider disk 224 having projections 225 at its periphery for resting upon an internal shoulder 226 at the upper edge of the container 200, this edge also having inward projections 227 spaced apart for permitting the downward movement of the spider projections 225, but serving upon rotation of the spider 224 to hold two parts in position and thus control the position and action of the spring 223. It is preferred to provide a damper 229 upon the needle valve WV to control its rate of motion upwardly and downwardly.

LABEL SHEET

The illustrated machine operates with strips of labels having perforations for engagement by the fingers 155 of the label feeding shuttle bars LFB. These label strips may be made up as paper sheets of letter size, and provided with small perforations in vertical and transverse rows; the vertical rows dividing the sheet into three columns (Fig. 1), and the transverse rows dividing the columns into individual labels which are also separated from one another by larger diamond-shaped perforations for engagement by the fingers 155. Such a sheet is described and claimed in the copending application of the same assignee, Ser. No. 409,153, filed February 9, 1954 by Attwood K. Hawes.

Such paper sheets are made with water re-moistening gum on the reverse thereof. They may be employed by inserting individual names and addresses in each label space on a typewriter; and it is feasible to employ carbon papers and prepare a number of such sheets with identical markings, for use upon successive items of a program of advertising.

Such a sheet can be introduced (Fig. 1) into the machine, with the printed material upward for easy inspection by engaging an edge loosely with the guide rail 150, and pushing the sheet forward by hand so that it enters beneath the first label top plate SHP, moving easily beneath the curved edge 151 thereof, and slightly lifting the bars 176. When so introduced, with a rough alignment of the larger sheet perforations above the feeding shuttle bars LFB, these bars present their reciprocating fingers 155 so that such fingers can enter the larger perforations, and thereupon automatic forward feeding of the label sheet begins. As described hereinafter, this automatic feeding continues, upon the introduction of a strip of labels, until the leading label encounters the finger 182 (Fig. 16) and actuates the label sensing switch LSS, this occurring as this first label attains a position in which the next automatic forward feeding will bring it beneath the label punch LP and over the label punch opening LPO, ready for cutting and delivery onto the envelope passing beneath this opening. The automatic feeding continues, with successive delivery of the labels beneath the punch and thence onto the successive envelopes, until the strip of labels (for example, the right-hand column in Fig. 1) is exhausted and the rest of the sheet now lies flat upon the top plate TP and its extension TSA. It will be noted from Figs. 5A and 15 that two of the shuttle bar grooves, being grooves 152, extend past the top housing TH so that they can engage with the larger perforations of a second row of labels (for example, the middle row of the label sheet L in Fig. 1), and thus maintain control of the label sheet with a positive aligned delivery of the last label of the first or right-hand row of Fig. 1. By comparison, the pair of grooves 153 beneath the right-hand row of labels, and the shuttle bars LFB moving therein, are shorter, and at their extreme forward movement in the feeding direction, these bars pass slightly beyond the lower edge of the label punch LP, which is notched (Fig. 15) to permit such movement, it being noted that these notches in the punch head LP are opposite the larger perforations of the label sheet, and hence no cutting is required at these regions. Thus, the feeding shuttle bars LFB for the right-hand row of labels, of Fig. 1, extend beneath the last label of such row when it is about to move forward to position under the punch head LP, and the last pair of fingers 155 of these bars can thus serve for pushing this last label of the row into position over the opening LPO and beneath the punch head LP. This therefore permits the successive feeding of a multi-column sheet of labels, with assurance that every label of the sheet will be properly fed and employed.

With the three-column sheet illustrated in Fig. 1, the automatic feeding continues until all labels of the first column have been consumed, and then the label feeding movement is terminated as described hereafter, because the finger 182 of the label sensing switch LSS is no longer in contact with a label which is in position for feeding beneath the punch. At this stage, the operator can pull the remaining sheet, comprising the center and left-hand column of Fig. 1 from the machine and return it by re-feeding it beneath the curved edge 151 and loosely against the rail 150: the feeding shuttle bars LFB with their fingers 155 again engage with the sheet but now with the major perforations of the central column: an initial continued automatic feeding occurs until the finger 182 of the label sensing switch LSS is again moved, and thereafter the feeding continues as envelopes are brought forward in the machine for receiving the successive labels, which are successively detached and delivered by the punch head LP through the opening LPO and onto the passing envelope. When this central column has been totally consumed, the operator removes the label sheet, now reduced to a single column, and feeds this in similar manner into the machine, as indicated in Fig. 2, and this column in like manner is automatically fed until it actuates the finger 182 of the switch LSS, and thereafter individual feedings occur so that all of the labels of the sheet have ultimately been delivered onto individual envelopes passing beneath the opening LPO in the die plate. It will be noted that the last label is being engaged by the fingers 155 of the shuttle bars LFB which are moving in the grooves 153, this engagement occurring at the rear edge of this label, which has half-diamonds corresponding to the major perforations provided at the transverse lines of tearing perforations present on the sheet.

The fingers 155 of the shuttle bars have inclined front edges, leading from a central vertical edge (Figs. 20, 21 and 24) which conforms to the broad side of a diamond perforation in the sheet; and travel in the grooves 155a. The upward surface of each finger is inclined downwardly and rearwardly, relative to the direction of feeding of the sheet, so that the retraction movement of the shuttle bars LFB causes the fingers 155 to lift overlying portions of the label sheets while the sheet is being frictionally detained by the plates SHP, SHQ, and by the gravity bars 176. By design, the width of each finger 155 is less than the lengths of the diamond-shaped perforations, and hence the engagement of the fingers with the walls of these perforations has the effect of producing minor transverse movements of the label sheet L, until the columns of labels are accurately aligned for positioning beneath the punch head LP; it being noted that the guide rail 150 is merely for a gross positioning to permit the fingers 155 to begin their automatic action of feeding and aligning the sheet.

In the illustrative machine, the controls and interlocks are electrical; and their connections, purposes and effects will now be described.

CIRCUIT CONNECTIONS

The main switch MS can be a toggle switch of the usual type. The envelope hand switch EHS can also be of toggle type with two poles, one of which (EHS*a*) is double throw and the other of which (EHS*b*) has single throw connections. The label hand switch LHS can be a single-pole, single-throw toggle switch. The cam switches AIS*a*, AIS*b* operated by the intermittently driven shaft AI are open at the close of one cycle and hence at the start of the next cycle: the shaft AI is shown (Fig. 25) as turning in the direction of the arrows, and is assumed to be in the position of standstill between cycles, wherewith switch AIS*b* will close momentarily at the beginning of a cycle and switch AIS*a* will close momentarily at the close of a cycle. The label sensing switch LSS is illustrated in the position occupied when no label is ready for delivery beneath the punch: when a label advances until ready for delivery, the switch LSS is moved to the "Label Ready" position indicated by the dash line. The envelope sensing switch ESS is open unless an envelope is passing through the machine and is actuating the switch arm 136 (Fig. 4). The coil of the relay R is normally de-energized, so that its contacts R*a* are closed and contacts R*b* open.

The connection of the electrical parts is schematically shown in Fig. 25. The power cable PC (Fig. 1) has its conductors connected within the base housing to fuses and to a main switch MS whose control handle is shown on the exterior in Fig. 1. When this switch is closed, current can flow by conductor 400 to the motor EM, returning by conductors 402, 401 to the external cable PC. A branch 404 from conductor 400 extends to the envelope feed solenoid EFM, continuing by conductor 406 therefrom and to the manual envelope control switch EHS, whose external handle is indicated in Fig. 1. The switch EHS has two electrically independent blades; the upper blade EHS*a* (Fig. 25) can engage either an upper contact or a lower contact; the lower blade EHS*b* can engage only an upper contact. The conductor 406 leads to the upper contact blade EHS*a*. When the upper blade EHS*a* is lowered, the current path then continues to the conductor 401, for energization of the solenoid EFM. The normally open contact EFS controlled by solenoid EFM is connected by a conductor 407 to the switch AIS*a* which (Fig. 4A) is closed momentarily during the cyclic movement of the intermittently actuated shaft AI, shortly before the end of the cycle: when this circuit is closed, the current flow continues by conductor 408 to the lower blade EHS*b* of switch EHS, and thence when the switch EHS is in raised position may go by conductor 409 to the manual label feeding switch LHS, illustrated by a control handle in Fig. 1, so that when switch LHS is closed, the current flow continues to conductor 401 and thus to the power cable PC.

Another branch 410 from conductor 404 leads to the clutch solenoid CM and thence by a conductor 411 to a normally closed contact system R*a* of a relay R, continuing by conductor 412 to the moving blade of the label sensing switch LSS, which, when no labels are present, is in the full-line position shown in Fig. 25, by which the current can flow to conductor 409 and thence, when the manual label switch LHS is closed, to conductor 401 for completing the circuit and energizing clutch solenoid CM.

Another branch 415 from conductor 404 leads to the coil of relay R and thence by conductor 416 to a contact of the cam switch AIS*b* which (Fig. 4A) is cyclically actuated by the intermittently driven shaft AI, being closed momentarily just before the shaft reaches the end of its cycle so that current then flows to the switch blade and thence by conductor 417 to a contact of the label sensing switch LSS which is open when no label is ready but is closed when a label is present at the arm 182 (Fig. 16) of switch LSS. The normally open contacts R*b* of the relay R are connected to conductor 416 and to conductor 417, to form a maintaining circuit upon energization of relay R, independent of the movement of the shaft AI.

The conductor 404 also extends to form part of the cable 219 leading to the solenoid WDM which controls the needle valve WV (Fig. 22) of the moistening system, with a return by conductor 418 (also in part within the cable 219) to a further contact which also is closed momentarily at switch AIS*b* shortly after the shaft AI begins its cycle.

The envelope sensing switch ESS is connected by conductor 409, located in part within the cable 180, to the label hand switch LHS; and by conductor 419, also located in part within the cable 180, to a contact in the label sensing switch LSS which is closed when a label is ready.

The control and supervisory functions can be produced as follows:

*I. Normal or full automatic running*

It will be assumed that the machine has been set up for a long run of a single size and filling of envelope material, that all parts have been properly adjusted for this service and that the machine has been running, but has been shut down, empty of labels and envelopes, at the close of a shift. At the start of the next shift, operations can be resumed by inserting labels and envelopes and closing the main switch MS. That is, in such standstill condition, the main switch MS is open, motor EM is at a standstill, manual switches EHS and LHS are in their upper positions; no labels or envelopes are in the machine: intermittent shaft AI is at a standstill at zero in its cycle: cam switches AIS*a* and AIS*b* are open.

When the main switch MS is closed, current flows by the path PC—MS—400—EM—402—401—PC: and the motor runs. In addition, the following circuits are established, and functions attained:

(*a*) 400—404—405—EFM—406—EHS*a*—413—LSS: if no label is ready, then 409—LHS—401. EFM is energized and EFF raised: no envelopes (if present) are fed so long as no label is ready.

When a label sheet is introduced:

(*b*) 400—404—410—CM—411—R*a*—412—LSS—409—LHS—401. CM energizes, shaft AI cycles, shuttles advance label sheet until a label attains the ready position and moves LSS, whereupon this circuit opens at LSS and AI will come to a standstill at the end of its cycle if no envelopes are present.

If envelopes are present:

(*c*) 400—404—410—CM—411—R*a*—412—LSS—419—ESS—409—LHS—401. CM is controlled by ESS, and only energizes when ESS is closed: thus the cycle of AI starts when the leading edge of an envelope closes ESS, and thus the label is deposited at a pre-selected distance from this leading edge.

(*d*) If no envelope is passing ESS, the circuit through R is open at ESS. If no label is ready, the circuit through R is open at LSS. If an envelope is passing and a label is ready, then: 400—404—415—R—416—AIS*b* (momentarily closed just after start of cycle)—417—LSS—419—ESS—409—LHS—401. R closes a shunt branch R—416—R*b*—417 to hold R closed until LSS or ESS opens. Thus relay R remains closed as long as the envelope holds ESS closed: and for a long envelope, the now-open contact R*a* holds CM de-energized so that AI stops at the end of its cycle, and there is no initiation of a second cycle by which a second label might be applied to such envelope: but when the rear edge of the envelope releases ESS, the holding circuit through relay R is opened, the relay is de-energized, and CM is then tripped again (a label being ready) when the next envelope closes ESS. If no label is ready, LSS has moved and prevents ESS from closing a circuit to CM. However, circuit I—(*b*) has been reestablished, so that CM is held energized until a new label sheet has been introduced and advanced to ready position.

If an envelope encounters and closes ESS:

(*e*) 400—404—219—WM—418—AIS*b* (closed at start of cycle)—417—LSS—419—ESS—409—LHS—401: WDM energized, and the valve WV opens. CM has started the cycle of shaft AI, and AIS*b* soon opens this circuit: hence its closure time interval is determined by the system and accurate amounts of liquid are fed when proper in the operation.

This fully automatic action continues so long as both envelopes and labels are present for use, the successive envelopes being fed and moistened, and the labels delivered thereto in succession.

Upon failure of envelopes, the circuit conditions are re-established as in I—(*b*) above, and the shaft AI remains at a standstill following the close of a cycle, until envelopes have again been placed in the machine: whereupon the bottom envelope of the new stack is fed through the machine, and the full automatic running resumes. It is also possible to hand-feed envelopes one by one, producing an automatic movement of each envelope through the machine, with the proper automatic delivery of a label thereto.

If the labels become exhausted, then the circuit connections return to the condition of I—(a), until a label sheet or strip has been introduced: whereupon condition I—(b) is established, and this label sheet is fed forward until a label is ready for advancement beneath the punch; and thereupon full automatic operation resumes.

It will be noted that a holding circuit is provided for the coil EFM, for the purpose of preventing a false envelope delivery.

If there are envelopes in the hopper, prevented from feeding by an energized EFM, assuming full automatic operation, a label moving into ready position will shift LSS to the right. In doing so, circuit 400—405—EFM—406—EHSa—413—LSS—409—LHS—401 will be broken at LSS, thus de-energizing EFM. Since this occurs near the mid-point of a cycle, it would mean that the next envelope could start feeding too soon, that is, before the existing cycle of shaft AI is completed. This could cause CM to be energized before the clutch has stopped the shaft AI at the end of a cycle, thereby misplacing the label, lengthwise, on an envelope already too far advanced. This might be acceptable on a long envelope, but with a short envelope, the misplacing might have only half the label adhered to the envelope and the other half extending beyond the envelope edge.

This condition is prevented in the following manner: taking the instance before a label shifts LSS to the right, a circuit is formed 400—404—405—EFM—406—EHSa—413—LSS—409—LHS—401, energizing EFM and at this moment there is also a parallel circuit 400—404—405—EFM—closed contacts EFS—407: then by AISa—(just closed) EHSb closed—409—LHS—401—. An instant after LSS has shifted, which would ordinarily have opened the circuit to EFM, and allowed EFF to drop and let an envelope be fed, a holding circuit is retained, by 400—404—405—EFM—407—AISa—408—EHSb—409—LHS—401, till the very moment the clutch latches up at the end of the cycle. Therefore, when running full automatic, envelopes can never start feeding before the clutch driving AI has practically latched up.

*II.—Manual label feed control running*

This differs from full automatic running, in that label movements can be effected, but no delivery of envelopes occurs. Hence, this condition can be employed by the operator to make sure of accurate label deliveries. For this condition, the envelope hand switch EHS is moved down, while the label hand switch LHS is left up. The following circuits and tentative circuits are established:

(a) 400—404—405—EFM—406—EHSa—401: EFM energized and no envelopes are fed.

(b) EFM closes its contacts EFS, but without effect as the circuit 407—AISa—408— is open at EHSb.

When AISa momentarily closes during the cycle, no effect occurs.

(c) 400 — 404 — 410 — CM — 411 — Ra — 412 — LSS—409—LHS—401; CM energized: AI cycles until LSS is moved. Hence, if label sheet is introduced, it is automatically stepped forward until 182 is moved, and LSS changes: this occurs at mid-point of cycle, while bars LFB are moving forward with label. Then AI stops at end of existing cycle.

(d) 400—404—415—R—416—AISb (closed momentarily during cycling)—417, is open at LSS; R has no control of CM.

(e) 400—404—415—R—416 is open at Rb.

(f) 400—404—219—WM—418—AISb—417 is open at LSS: No delivery of liquid.

When the label sheet has been fed until LSS changes, then II—(a) above is unchanged: II—(b) is unchanged, II—(c) changes by opening at LSS, and a new circuit is tentatively established:

(g) 400 — 404 — 410 — CM — 411 — Ra — 412 — LSS—419—ESS which is open at ESS, and ESS is waiting for an envelope to arrive.

II—(d) becomes:

(h) 400 — 404 — 415 — R — 416 — AISb — 417 — LSS—419—ESS which is open at ESS, also waiting for an envelope.

II—(e) becomes:

(i) 400 — 404 — 219 — WM — 418 — AISb — 417—LSS—419—ESS which is open at ESS also waiting for an envelope: No delivery of liquid.

*III.—Manual envelope feed control running*

This is the converse condition, in which envelopes may be fed through the machine, but without application of labels thereto. This condition is useful to the operator in permitting him to make sure that the envelope holding and feeding parts are in proper adjustment for the particular size, thickness, etc., of the envelope matter. For this, the envelope hand switch EHS is left up, just as in full automatic running, and the label hand switch LHS is moved down. Assuming that there are no labels in the machine, so that the finger 182 has not moved the label sensing switch LSS, the following and tentative circuits are established:

(a) 400 — 404 — EFM — 406 — EHSa — 413 — LSS—409—EHSb—408 is open at AISa and LHS. EFM is not energized, fingers EFF drop and envelope feeding can occur. Circuit I—(b) has been tentatively re-established but is open at LHS, so CM is not energized.

(b) Since EFM is not energized, the tentative circuit by 400—404—405—EFM—EFS—407—AISa with continuity by 408—EHSb—409, is broken at LHS, AISa and EFS.

(c) 400 — 404 — 410 — CM — 411 — Ra — 412 — LSS—409— is open at LHS: the branch LSS—413—EHSa carries no current as there is no connection to 401: hence CM is not energized and AI remains at a standstill.

(d) 400—404—415—R—416 is open at AISb: R is not energized.

(e) 400—404—219—WD—418— is also open at AISb: no liquid is delivered.

When label is at 182—LSS and LSS in right-hand position:

(a) 400—404—EFM—406—EHSa—413 is open at LSS, LHS and EHSa: EFM is de-energized and envelopes can feed.

(b) 400—404—410—CM—411—Ra—412—LSS is open at ESS, AISb and Rb: AI remains at a standstill.

(c) 400—404—415—R—416— is open at both Rb and AISb: R is not energized.

(d) 400—404—219—WD—418 is also open at AISb: no liquid is delivered.

In this condition, the envelopes are fed one by one, without wetting or application of labels: and the operator can adjust for proper feeding of the envelope, whether card, empty wrapper or filled wrapper.

It will also be noted that there is a condition in which the main switch MS has been closed, while both of the manual switches LHS and EHS have been moved to the lower position. With such circuit connections, there is no label feeding but envelope feeding; the constantly driven parts operate. Thus, when the main switch MS is closed, a circuit is established by PC—MS—400—EM—402—401—PC: the motor is energized and runs. However, the other circuits remain open, as follows:

(a) 400—404—405—EFM—406—EHSa—401: EFM is energized and EFF are raised to prevent envelope feed.

(b) 400—404—410—CM—411—Ra—412—LSS—409 is open at LHS; and its branch from LSS by 413 is open at EHSa.

(c) 400—415—R—416 open at AISb.

(d) 400—415—R—416— open at Rb.

(e) 400—219—WDM—418— open at AI$Sb$.

The description has been given of an embodiment of the various elements and structures which cooperate for full automatic, semi-automatic and manual operations, with controls upon the system and with adjustments for the various conditions encountered in practice: but it will be understood that other embodiments are possible within the scope of the appended claims, and that individual sub-combinations can be employed without inclusion of all the parts and elements.

I claim:

1. A machine of the class described, comprising a die, a continuously active article feeding means for moving an article past the die, label feeding means for advancing the first label of a strip to position across the die, a label punching means cooperative with the die for severing the advanced label and delivering the same against the moving article, and devices controlled by the presence of the article approaching the die for initiating a cycle of operation including the severing and delivery of the label to the article and thereafter the feeding of the next label across the die.

2. A machine of the class described, comprising a top plate, a stage below the top plate for pressing an envelope upward thereagainst, means for continuously feeding an envelope between the top plate and stage, the top plate having a die opening above the envelope path, a punch mounted above the die opening and cooperative therewith for cutting a label, means for moving the punch through the opening, means for feeding a label strip over the top plate and across the die opening, means responsive to the envelope as the same approaches the label-applying position beneath said punch for initiating a label cutting and feeding, and power devices controlled by said responsive means and effective for actuating the punch when an envelope is in position to receive a label and for feeding the label strip after a label has been cut therefrom and the punch retracted.

3. A machine of the class described, comprising a housing having a top plate with a die opening, a spring stage for pressing an envelope upward against the top plate at said opening and for advancing the envelope beneath said plate and past the die opening, means for feeding an envelope between the top plate and stage; means for feeding a label strip across the opening and above the top plate, a punch supported above the top plate and cooperative with the die opening, means for actuating the punch to effect severing of a label from the strip and the delivery thereof through the die opening and against the envelope, and devices controlled by the position of the advancing envelope for initiating a cycle of punch movement and thereafter a feeding of the label strip for presenting a new label above the die opening.

4. A machine as in claim 3, in which the said controlled devices include parts to prevent envelope feeding and the initiation of a new cycle until the said advancing envelope has totally passed the said position.

5. A machine as in claim 3, in which the envelope is fed lengthwise beneath the top plate in one direction, and in which the label strip comprises elongated labels, and said strip feeding means acts to feed the strip along its narrow dimension and above the top plate in a direction transverse to that of the envelope movement and includes shuttle members spaced apart along the wide dimension of the label and cooperative with the label to push the same beneath the punch toward the end of the said cycle.

6. A machine of the class described, comprising a housing having an apertured top plate, means for feeding an envelope beneath the top plate, a rockable stage with springs spaced from one another in the direction of envelope advancement for pressing the envelope against the top plate, label shuttle members operative in holes in a label strip for feeding the label strip above the top plate and across an aperture thereof, and a punch supported above the said aperture, edges of the aperture providing a cutting die cooperative with the punch, said punch having a space alined with the label holes for receiving a shuttle member.

7. A machine of the class described, comprising a housing having a top plate with a die aperture and a bottom groove extending from the top plate aperture, a spring stage including driven means for advancing an envelope beneath and in contact with the top plate, label feeding means for advancing a label strip above the top plate and across said aperture thereof, a punch supported above the said die aperture and cooperative with edges thereof for severing a label from the strip and delivering the same through the aperture and against the envelope, and rolls positioned at said groove for pressing the applied label against the envelope while the latter is supported by the spring stage.

8. A machine of the class described, comprising a housing having a top plate, envelope stack-supporting means above the top plate, envelope feeding means for delivering envelopes successively from the stack-supporting means and beneath the top plate, a finger for detaining the envelopes against being fed from the stack, means for advancing the envelopes beneath the top plate and opposite an aperture therein, label feeding means for positioning a label across the top of said aperture, and devices responsive to the presence of a label in position ready to be so fed and effective to operate the finger into preventing position when no label is ready to be fed and effective when a label is ready to be fed for procuring the delivery of an envelope.

9. A machine of the class described, comprising a housing having an apertured top plate, means for feeding an envelope beneath the top plate, a stage having means thereon for advancing the fed envelope beneath the top plate and across an aperture thereof, springs for pressing the stage upwardly toward the top plate and effective to permit rocking movements thereof in response to the feeding and advancement of an envelope, label feeding means for positioning a label above the top plate and across said aperture, means for delivering the label through the aperture and against the envelope, power devices including a constant drive for the envelope feeding and advancing means and a cyclic drive for the label feeding and delivering means, and devices controlled by the presence and position of the envelope for initiating a movement of the cyclic drive.

10. A machine of the class described, comprising a housing having an apertured top plate, means for feeding an envelope beneath the top plate, a stage having rotary means thereon for advancing the fed envelope beneath and in contact with the top plate and past an aperture thereof, means for feeding and delivering a label through said aperture, and spring means located in front and behind said aperture for pressing the stage upwardly and effective to permit rocking of the stage, the first-encountered advancing means on the stage being a rotating device with its axis located above and in the line of upward effort of the spring means in front of the aperture.

11. A machine of the class described, comprising an apertured plate having a groove in the lower surface thereof, means for feeding an envelope beneath and in contact with the plate, a stage including a spring-pressed frame and rollers spaced apart across the groove, envelope moistening means active through an aperture of the plate, the groove having a width effective for the passage of the moistened area without contact thereof with the plate, label feeding means for delivering a label through an aperture of the plate, and means for driving said rollers; whereby an area of the advancing envelope is moistened by said moistening means, said area is advanced opposite said groove, the label is delivered onto said area, and the envelope is further advanced with the label opposite said groove.

12. A machine of the class described, comprising a housing, having an apertured top plate, envelope feeding and advancing means for moving an envelope beneath the top plate and across an aperture thereof, label delivery means for moving a label through the aperture and against the envelope, a constant drive for actuating the envelope feeding and advancing means, an intermittent drive for actuating the label delivery means, and devices controlled by the presence and position of an envelope for initiating operation of the intermittent drive.

13. A machine of the class described, comprising a housing having an apertured top plate, envelope feeding and advancing means for moving an envelope beneath the top plate and across an aperture thereof, label feeding means for delivering a label through the aperture and against the envelope, a constant drive for actuating the envelope feeding and advancing means, an intermittent drive for actuating the label feeding means, and devices controlled by the presence of a label for preventing delivery of an envelope to the envelope feeding means if no label is ready and effective when a label is ready to be fed for procuring the delivery of an envelope.

14. A machine of the class described, comprising a housing having an apertured plate, means for feeding and advancing envelopes along the plate and across an aperture thereof, means for feeding a label strip along the opposite side of the plate and across the aperture, means for severing a label from the strip and delivering it through the aperture and against the envelope, a constant drive for the envelope advancing means, an intermittent drive for the label feeding, severing and delivering means, and devices controlled by the presence of and position of the leading edge of an envelope for initiating a movement of the intermittent drive and including parts for stopping the intermittent drive after a cycle of operation and effective to prevent a further delivery of an envelope to the envelope advancing means until the rear end of the prior envelope has passed to predetermined position.

15. A machine of the class described, comprising a housing having an apertured top plate, means for advancing an envelope beneath the top plate and across an aperture thereof, a first label plate supported above the top plate, label friction bars movable up and down in the label plate for pressing a label strip against the top surface of said top plate, and label feeding devices movable along the top surface of said top plate for advancing a label strip toward said aperture.

16. A machine as in claim 15, including also a second label plate loosely supported from the housing for frictionally engaging and pressing the label strip against the top plate.

17. A machine as in claim 15, including also a second label plate loosely supported from the housing for frictionally engaging and pressing the label strip against the top plate, said label feeding devices having parts extending above the upper surface of the top plate, said second label plate having grooves on the lower surface thereof for receiving and permitting free movement of the said parts.

18. A machine as in claim 17, in which the label feeding devices are reciprocable shuttle bars having upwardly extending fingers presenting rearwardly inclined surfaces at their tops and sides for engaging in perforations of the label strip and effective for aligning the label strip.

19. A machine of the class described, comprising a housing having an apertured top plate, continuously active means for advancing an envelope beneath the top plate and past moistening and label-applying apertures thereof, means for feeding a gummed label above the top plate and across a label aperture thereof with the gummed surface downward, a moistening device and means for moving the same through a plate aperture for moistening an area of the envelope, a punch movable through the label aperture for pressing the label against the wetted area of the envelope, an intermittent cyclic drive for first actuating the moistening device and then the punch, and devices controlled by the presence and position of an envelope for initiating the operation of the cylic drive and thereby effecting moistening and label application with said area at a predetermined location on the envelope.

20. A machine of the class described, comprising a housing having an apertured top plate, means for advancing envelopes beneath the top plate and past a moistening aperture thereof, means for delivering successive labels through a label aperture of the top plate, a movable moistening device mounted above the top plate and acting through an aperture thereof to moisten an area of the envelope surface, a liquid reservoir and a conduit therefrom including a valve for delivering liquid to the moistening device, and devices controlled by the presence and position of an envelope for procuring successive movements of the moistening device and the label delivering device, and including a part for opening said valve only when an envelope is present.

21. A machine of the class described, comprising a housing having an apertured top plate, a stage for pressing an envelope upwardly against the top plate and including thereon devices for advancing the envelope across an aperture of the top plate, label delivery means for moving a label through said aperture, a sensing device mounted on said stage for movement in the direction of envelope advancement and actuated by the envelope, devices operated by the sensing device to procure operation of the label delivery means, and means for moving said sensing device to and securing it at a selected point of the envelope advancement whereby to determine the area on the envelope at which the label is delivered.

22. A machine as in claim 21, in which the spring supports are provided for the stage to permit downward and rocking movements thereof, and in which the said moving means includes a flexible shaft and an externally accessible operator for the shaft.

23. A machine of the class described, comprising a housing, means for advancing an envelope in the housing, means for feeding labels through a housing aperture and against the envelope, a moistening device for applying liquid to the envelope prior to label delivery thereto, a shaft, a cam on the shaft for positively moving the label feeding device, a second cam for retracting the moistening device, a spring for moving the moistening device to applying position, and envelope-controlled means for initiating movements of the shaft.

24. A machine of the class described, comprising a housing, envelope advancing and label feeding means, a constant drive in the housing to operate the envelope advancing means, an intermittently driven shaft having a projection thereon, a constantly driven shaft concentric with the intermittently driven shaft and a ratchet thereon, a drive pawl carried by the intermittent shaft and engageable in the ratchet whereby to procure movement of the intermittent shaft, a detaining device on the housing for engaging the drive pawl and causing it to move out of such engagement, the parts being so located that said detaining device also engages said projection shortly after engaging said drive pawl, a latch carried by the detaining device to prevent retrograde movement of the intermittent shaft, and means for moving the detaining device for procuring operation of the intermittent shaft.

25. A machine of the class described, comprising a frame, envelope advancing means and a constant drive therefor, label feeding means and an intermittent drive therefor, an envelope sensing device positioned on the frame for contact by the advancing envelope, means controlled by said sensing device when an envelope is sensed thereby to initiate movement of the intermittent drive, means included in the intermittent drive for bringing it to a standstill at the end of a feeding cycle, and means controlled by both the sensing device and the intermittent drive for holding the drive at a standstill when the sensing device remains energized beyond the duration of a single cycle.

26. A machine of the class described, comprising a frame, envelope advancing means and a constant drive therefor, label feeding means and an intermittent drive therefor, an envelope sensing device positioned on the frame for contact by the advancing envelope, means included in the intermittent drive for stopping it at the end of each feeding cycle, means controlled by the sensing device for operating the stopping means and thereby initiating a new cycle, and means controlled by the sensing device for preventing the initiation of a new cycle if the rear edge of the envelope has not cleared the sensing device at the close of an operating cycle.

27. A machine of the class described, comprising a frame, envelope advancing means and a drive therefore, label feeding means and an intermittent drive therefor including a cycle-terminating movable stop, an envelope sensing device positioned on the frame for contact by the leading edge of the advancing envelope, means controlled by said sensing device for moving said stop to disengaged position and effective to initiate a cycle of the intermittent drive when the envelope first encounters said sensing device, and means superseding the control by said moving device and controlled by said sensing device for preventing a further initiating movement of said stop until the envelope has left the sensing device.

28. A machine of the class described, comprising a frame, envelope advancing means and a drive therefor, means for preventing delivery of envelopes to said advancing means, label feeding means and an intermittent drive therefor, an envelope sensing device positioned on the frame for engagement by the advancing envelope, means controlled by said sensing device for initiating a cycle of movement of the intermittent drive when an envelope encounters said sensing device, and means controlled from said sensing device for actuating said preventing means and effective to prevent delivery of a further envelope until the advancing envelope has cleared the sensing device.

29. A machine of the class described, comprising a frame, envelope advancing means and a constant drive therefor, means for preventing the feeding of envelopes, label feeding means and an intermittent drive therefor, means for preventing delivery of envelopes to said advancing means, an envelope sensing device positioned on the frame for engagement by the advancing envelope, a label sensing device positioned on the frame for engagement by a label when ready for advancement and delivery to an advancing envelope, means controlled by said envelope sensing device for initiating a cycle of movement of the intermittent drive when an envelope encounters said envelope sensing device, means controlled by the label sensing device for operating said preventing means to prevent the feeding of an envelope when no label is present at the label sensing device and effective to initiate cycles of movement of the intermittent drive until a label is so present and thereupon to procure termination of movement of the intermittent drive at the end of the existing cycle, and means controlled by the envelope sensing device for presenting the start of a new cycle when an advancing envelope is engaged with the envelope sensing device at the close of the existing cycle.

30. A machine of the class described, comprising envelope feeding means, label feeding means, a rockable moistener lever having a hollow head with a bottom opening, a wick extending across the opening and upwardly within the head, rotatable spurred elements on the head for engaging and tightening the wick, means for driving the said feeding means and lever and effective to move the label feeding means and the lever in timed relation, said wick being engageable with the face of an envelope carried by the envelope feeding means during rocking of the lever, and a label applying device for applying a label upon the wetted part of the envelope connected for operation in timed relationship by said driving means.

References Cited in the file of this patent

UNITED STATES PATENTS

| | | |
|---|---|---|
| 716,434 | Kneisly | Dec. 23, 1902 |
| 1,363,065 | Thacker | Dec. 21, 1920 |
| 1,407,026 | Greenough | Feb. 21, 1922 |
| 1,543,873 | Rundell | June 30, 1925 |
| 1,668,967 | Labombarde | May 8, 1928 |
| 1,908,291 | Goss | May 9, 1933 |
| 1,949,159 | Gay | Feb. 27, 1934 |
| 1,986,611 | Thomsen | Jan. 1, 1935 |
| 1,995,306 | Hesson | Mar. 26, 1935 |
| 2,224,138 | Trydal | Dec. 10, 1940 |
| 2,353,232 | Greene | July 11, 1944 |
| 2,555,325 | Doane | June 5, 1951 |
| 2,606,681 | Ridenour | Aug. 12, 1952 |